United States Patent
Tsukamoto et al.

(10) Patent No.: US 7,285,892 B2
(45) Date of Patent: Oct. 23, 2007

(54) STATOR HAVING TEETH WITH A PROJECTING PORTION EXTENDING OUTWARDLY FROM A WINDING PORTION AND A YOKE PORTION

(75) Inventors: Toshinori Tsukamoto, Utsunomiya (JP); Hirofumi Atarashi, Shioya-gun (JP); Yasuhiro Endo, Ichikawa (JP); Mitsuyoshi Takao, Shioya-gun (JP); Akira Kato, Toyota (JP); Takeo Arai, Fujimi (JP); Takeo Fukuda, Kawachi-gun (JP); Hiroyuki Kikuchi, Shioya-gun (JP); Kazuaki Igarashi, Utsunomiya-shi (JP)

(73) Assignee: Honda Motor Co., Ltd., Tokyo (JP)

( * ) Notice: Subject to any disclaimer, the term of this patent is extended or adjusted under 35 U.S.C. 154(b) by 326 days.

(21) Appl. No.: 10/485,967
(22) PCT Filed: Jul. 17, 2002
(86) PCT No.: PCT/JP02/07248

§ 371 (c)(1),
(2), (4) Date: Aug. 24, 2004

(87) PCT Pub. No.: WO03/017447
PCT Pub. Date: Feb. 27, 2003

(65) Prior Publication Data
US 2005/0012425 A1 Jan. 20, 2005

(30) Foreign Application Priority Data
Aug. 9, 2001 (JP) ............................. 2001-242341
Dec. 28, 2001 (JP) ............................. 2001-401173

(51) Int. Cl.
*H02K 1/14* (2006.01)
*H02K 1/16* (2006.01)
*H02K 1/18* (2006.01)

(52) U.S. Cl. .................. 310/218; 310/216; 29/596
(58) Field of Classification Search ............ 310/216, 310/218, 179, 259, 180, 258, 217, 192, 193; 29/596
See application file for complete search history.

(56) References Cited

U.S. PATENT DOCUMENTS 1,115,947 A * 11/1914 Lincoln .................. 310/258

(Continued)

FOREIGN PATENT DOCUMENTS

JP 2-17947 2/1990

(Continued)

OTHER PUBLICATIONS

Machine translation of JP 06-153465, JP 07-163074 (supplied by applicant) & JP 2000-156947 (supplied by applicant).*

*Primary Examiner*—Karl Tamai
(74) *Attorney, Agent, or Firm*—Westerman, Hattori, Daniels & Adrian, L.L.P.

(57) ABSTRACT

In the field of stators including divided tooth-shaped iron cores and core back iron cores, a stator is provided in which the tooth-shaped iron cores and the core back iron cores can be easily connected to each other, and the tooth-shaped iron cores and the core back iron cores can be prevented from coming off in the radial direction. In the stator of the present invention, a yoke (24) is formed such that the circumferential width thereof is greater at a radial-outer region than at a radial-inner region, i.e., such that the distance (a) between yoke side faces (24A, 24A) gradually increases from a radial-inner region to a radial-outer region, and the distance (b) between two yoke side faces (24A, 24A) opposing each other and facing a space between the tooth-shaped iron cores (11, 11) that are disposed along a predetermined circumference with a predetermined interval is set to be a predetermined value over a range from a radial-inner region to a radial-outer region, or alternatively, is set so as to slightly decrease from a radial-inner region to a radial-outer region. A stator (10) is formed by inserting each of the core back iron cores (12) into a space between the tooth-shaped iron cores (11, 11) adjacent to each other. The present invention also provides a stator in which a packing factor can be increased and the magnetic flux can be made smooth, and a manufacturing method therefor.

4 Claims, 14 Drawing Sheets

U.S. PATENT DOCUMENTS

| | | | | |
|---|---|---|---|---|
| 1,957,380 | A | * | 5/1934 | Wilfrid ................ 310/259 |
| 2,433,660 | A | * | 12/1947 | Granfield ............. 310/259 |
| 5,723,931 | A | * | 3/1998 | Andrey ................ 310/179 |
| 6,603,234 | B2 | * | 8/2003 | Heyden et al. ....... 310/194 |
| 6,838,800 | B2 | * | 1/2005 | Takao et al. ......... 310/198 |
| 2005/0012425 | A1 | * | 1/2005 | Tsukamoto et al. ... 310/218 |

FOREIGN PATENT DOCUMENTS

| | | | |
|---|---|---|---|
| JP | 4-101274 | | 9/1992 |
| JP | 5-33652 | | 4/1993 |
| JP | 06153465 | A * | 5/1994 |
| JP | 7-163074 | | 6/1995 |
| JP | 10-271716 | | 10/1998 |
| JP | 11-89188 | | 3/1999 |
| JP | 200-50539 | | 2/2000 |
| JP | 2000-156943 | | 6/2000 |
| JP | 2001-136687 | | 5/2001 |
| JP | 2001-238388 | | 8/2001 |

* cited by examiner

STATOR HAVING TEETH WITH A PROJECTING PORTION EXTENDING OUTWARDLY FROM A WINDING PORTION AND A YOKE PORTION

FIELD OF THE INVENTION

The present invention relates to a stator for a motor-generator and to a manufacturing method therefor.

DESCRIPTION OF RELATED ART

FIG. 19 is a plan view showing the main portion of a stator as an example of prior art, which includes a stator iron core having divided iron cores 2, . . . , and 2, each of which is allocated for a slot.

However, in this stator, a problem is encountered in that connection work is difficult because there is no means to connect the divided iron cores 2, . . . , and 2 to each other at predetermined positions.

FIG. 20 is a plan view showing the main portion of a stator as another example of prior art, which includes a stator iron core having yoke 3 and teeth 4, . . . , and 4 which are connectable to the yoke 3.

In this stator, the yoke 3 includes connecting concave portions 3a, . . . , and 3a therein, and each of the teeth 4, . . . , and 4 includes a connecting convex portion 4a which is connectable to one of the connecting concave portions 3a, . . . , and 3a formed in the yoke 3. The connecting convex portion 4a is inserted into the connecting concave portion 3a along a direction parallel to the axis of the stator.

However, in this stator, complicated work is required in that a coil end portion for a stator winding provided on each of the teeth 4, . . . , and 4 must be formed when the teeth 4, . . . , and 4 are connected to the yoke 3.

FIG. 21 is a plan view showing the main portion of a stator as another example of prior art, which includes a stator iron core having yoke 5, teeth 6, . . . , and 6 which are connectable to the yoke 5, and connecting iron elements 7 for fixing the teeth 6 that are mounted on the yoke 5.

However, in this stator, a problem is encountered in that cost for manufacturing a stator is increased because special elements, i.e., the connecting iron elements 7 for fixing the teeth 6 to the yoke 5, are required.

In view of the above problems, a stator, like a stator disclosed in, for example, Japanese Unexamined Patent Application, First Publication No. 2000-156943, is known, which includes a stator iron core that is divided into tooth-shaped iron cores and core back iron cores, and which is formed such that the core back iron cores are press-fitted into spaces between tooth-shaped iron cores from the outside in the radial direction after stator windings are wound in the slots between the tooth-shaped iron cores.

In this stator, the tooth-shaped iron cores adjacent to each other are continuously connected to each other at the inside end thereof, and the tooth-shaped iron cores are formed in a tapered shape in such a manner that the distance between the opposing side faces of the tooth-shaped iron cores adjacent to each other is set so as to increase from the inside toward the outside in the radial direction. Each of the core back iron cores is formed such that the width thereof in the circumferential direction is increased from the inside toward the outside in the radial direction so that each of the core back iron cores abuts against the opposing side faces.

In the above stator in the prior art, a problem is encountered in that the core back iron cores may easily come off in the radial direction if each of the core back iron cores is merely inserted into the space between the tooth-shaped iron cores adjacent to each other because the tooth-shaped iron cores are formed in a tapered shape in such a manner that the distance between the side faces of the tooth-shaped iron cores adjacent to each other is set so as to increase from the inside toward the outside.

In order to solve this problem, edge portions are provided, which project toward the outside in the circumferential direction from the outside edge of each of the tooth-shaped iron cores, and which act as elements that abut the outer ends of the core back iron core so as to restrain the displacement of the core back iron cores in the radial and outward direction.

However, problems are encountered in that complicated work is required in manufacturing a stator and in that manufacturing cost is increased because special elements for fixing each of the core back iron cores between the tooth-shaped iron cores adjacent to each other must be provided.

A first object of the present invention is to provide a stator which includes a stator iron core having divided tooth-shaped iron cores and core back iron cores, and in which the tooth-shaped iron cores and the core back iron cores are easily connected to each other, and the tooth-shaped iron cores and the core back iron cores can be reliably prevented from coming off in the radial direction.

In the stator such as disclosed in above-mentioned Japanese Unexamined Patent Application, First Publication No. 2000-156943, an inserter winding method and a concentrated winding method are known as a method for winding stator windings in slots between tooth-shaped iron cores. In the inserter winding method, it is difficult to make coil ends to be less tall. In contrast to this, in the concentrated winding method, stator windings can be wound on the stator while maintaining the coil ends to be less tall, which is advantageous.

Such methods are disclosed in, for example, Japanese Unexamined Patent Application, First Publication No. Hei 11-89188, Japanese Unexamined Utility Model Application, First Publication No. Hei 02-17947, Japanese Unexamined Utility Model Application, First Publication No. Hei 05-33652, and Japanese Unexamined Utility Model Application, First Publication No. Hei 04-101274.

However, problems described below are encountered when concentrated winding methods are used for winding wires. When concentrated winding methods are used for winding the wires, it is preferable that the stator windings be wound in each of the slots at one time because the winding process can be simplified. In addition, in order to increase a packing factor, the wires for stator windings must be wound around each of the tooth-shaped iron cores while applying tension to the wires so that the wires run in a substantially rectangular shape, and so that the wires firmly contact to each of the tooth-shaped iron cores. However, when the wire for the stator windings are wound at one time, electrical resistance in the windings positioned inside may differ from that in the windings positioned outside because the stator windings have significant thickness, and the stator windings near the corners of each of the tooth-shaped iron cores may be stretched. To prevent this problem, the wires for the stator windings must be wound while uniform tension is applied to the entire wires; however, if the wires are wound in this manner, the stator windings will run at the corners with a relatively large radius, and as a result, the packing factor is decreased. In other words, as shown in, for example, FIG. 22, i.e., as shown in a deployment, because the wires for the stator windings 103 are wound around each of the tooth-shaped iron cores 102 while having a curved shape, large spaces 104 are formed, and the packing factor is decreased.

In addition, when the stator windings are formed while having a curved shape, magnetic flux may not be smooth because the stator windings have uneven thickness, which may lead to degradation of performance of the stator. Accordingly, a stator which enables obtaining a smooth magnetic flux has been desired.

Moreover, in the case of a stator for a multiphase motor, such as a three-phase motor, a problem is encountered in that decrease in the above-mentioned packing factor is more significant because the stator windings must be formed for each of the phases. In addition, when the windings for one phase and the windings for another phase overlap each other in a single slot, another problem is encountered in that coil ends are positioned high because the thickness of the ends of the windings is increased by an amount corresponding to overlapping.

A second object of the present invention is to provide a stator and a manufacturing method therefor which enable obtaining a smooth magnetic flux while ensuring a high packing factor.

DISCLOSURE OF THE INVENTION

In order to solve the above problems and achieve the above objects, the present invention provides, as a first aspect, a stator including: tooth-shaped iron cores disposed along a predetermined circumference at predetermined intervals, each of which is formed so that the circumferential width thereof is greater at a radial-outer region than at a radial-inner region; stator windings formed on the tooth-shaped iron cores by being supplied from an radial-outer area using plural nozzles that simultaneously supply plural stator windings; and core back iron cores, each of which is inserted between the tooth-shaped iron cores adjacent to each other from an radial-outer area.

According to the stator constructed above, because the circumferential width of each of the tooth-shaped iron cores at a radial-outer region is set to be greater than that at a radial-inner region, when plural tooth-shaped iron cores are disposed in the circumferential direction of a predetermined circumference at predetermined intervals, the distance, for example, between the tooth-shaped iron cores adjacent to each other can be set so as to decrease from a radial-inner region to a radial-outer region.

As a result, when the core back iron cores, each of which has a constant width in the circumferential direction, is inserted into spaces between the tooth-shaped iron cores adjacent to each other, the core back iron cores are fixed by being sandwiched by, in particular, the radial-outer regions of the tooth-shaped iron cores adjacent to each other, and thus the core back iron cores can be prevented from coming off in the radial direction.

A stator according to a second aspect of the present invention including: tooth-shaped iron cores disposed along a predetermined circumference at predetermined intervals; core back iron cores, each of which is disposed between the tooth-shaped iron cores at a radial-outer region; and stator windings formed by connecting, in a parallel a manner, bundles of wires, each of which includes plural wires inserted between the tooth-shaped iron cores, wherein the bundles of wires for plural phases are wound plural times in a concentric manner while skipping a predetermined number of slots, and wherein a braided portion is formed by alternately braiding circumferential end portions of windings of one bundle of wires for one phase and circumferential beginning portions of windings of another bundle of wires for another phase.

According to the above construction, because the stator windings include bundles of wires, and the bundles of wires are wound plural times through the slots, tension at a radial-outer region is substantially equal to that at a radial-inner region even when the bundles of wires are wound at the corners of the slots. Accordingly, the bundles of wires can be wound so as to firmly contact with the side faces of the tooth-shaped iron cores; therefore, a packing factor can be increased while maintaining the coil ends to be less tall.

In addition, because the bundles of wires can be substantially uniformly wound through the slots, the magnetic flux can be made smooth. Moreover, because the bundles of wires for plural phases can be wound in the same direction, the manufacturing steps can be simplified. Furthermore, because the stator windings includes a braded portion which is formed by alternately braiding circumferential end portions of windings of one bundle of wires for one phase and circumferential beginning portions of windings of another bundle of wires for another phase, an increase in the height of the coil ends, which conventionally occurs due to overlapping of the beginning portions of windings with the end portions of windings, can be avoided.

In a stator according to a third aspect of the present invention, the bundles of wires includes plural bundle units that are wound plural times in a concentric manner, and, in the bundle units adjacent to each other for one phase, the beginning portions of the winding are separated from each other by an amount corresponding to a predetermined number of slots, and the winding directions are set opposite with respect to each other.

According to the above construction, the probability of twisting of the bundle of wires that connects the adjacent bundle units to each other can be reduced, and degree of freedom in forming the bundle unit can be increased, and thus a packing factor can be further increased.

More specifically, if the winding directions of the bundle units adjacent to each other in each of the phases are set the same with respect to each other, the beginning portion of one bundle unit is disposed adjacent to the end portion of another bundle unit, and these bundle units are substantially integrated. As a result, when one bundle unit is moved toward a radial inside in order to increase a packing factor, the adjacent bundle unit is also affected, and there is risk in that the bundle of wires connecting the bundle units adjacent to each other may become twisted.

On the other hand, if the winding directions of the bundle units adjacent to each other are set opposite with respect to each other, the beginning portion of one bundle unit is separated from the end portion of another bundle unit, and thus the bundle units are relatively independent from each other. As a result, the above-mentioned risk of twisting is reduced, and reliability is increased.

Moreover, if there is some variation in the bundle units (for example, the thickness at the beginning portion of winding is slightly greater than that at the end portion of winding), and when the bundle units are wound in the same direction, the variation may be amplified and increased.

On the other hand, when the bundle units are wound in the directions opposite with respect to each other, the variation can be cancelled overall even if there is above-mentioned variation in the bundle units; therefore, the bundles of wires can be more uniformly wound in the stator.

In a stator according to a fourth aspect of the present invention, the number of wires of the bundle of wires is set greater at a radial-outer region of the tooth-shaped iron cores than that at a radial-inner region of the tooth-shaped iron cores.

According to the above construction, by changing the number of wires of the bundle of wires depending on the radial position thereof between the tooth-shaped iron cores adjacent to each other, the cross-sectional area of the bundle of wires can be adjusted. As a result, the difference in the electrical resistance due to the difference in the circumferential lengths of the bundle of wires can be compensated for by the difference in the electrical resistance due to the difference in the cross-sectional areas of the bundle of wires, and the electrical resistances of the plural bundles of wires can be set substantially the same regardless of radial position between the tooth-shaped iron cores adjacent to each other. Accordingly, resistance loss in the stator can be restrained to be low, and operational efficiency of a motor incorporating the stator can be increased.

In a stator according to a fifth aspect of the present invention, the diameter of the wires of the bundle of wires is set to be greater at a radial-outer region of the tooth-shaped iron cores than that at a radial-inner region of the tooth-shaped iron cores.

According to the above construction, because the electrical resistances of the plural bundles of wires can be set substantially the same regardless of radial position between the tooth-shaped iron cores adjacent to each other, resistance loss in the stator can be restrained to be low, and operational efficiency of a motor incorporating the stator can be increased.

In a stator according to a sixth aspect of the present invention, each of the tooth-shaped iron cores is formed in a tapered shape such that the circumferential width thereof is greater at a radial-outer region than at a radial-inner region.

According to the above construction, the probability of displacement of the tooth-shaped iron core, which is disposed between the core back iron cores, in the radial direction, can be reduced, and thus stability can be increased.

In a stator according to a seventh aspect of the present invention, each of the core back iron core includes an extending portion extending from the radially outermost end thereof.

According to the stator constructed above, by providing the extending portion extending outward in the circumferential direction, when each of the core back iron cores is inserted between the tooth-shaped iron cores adjacent to each other, the displacement of the core back iron core in the radially inward direction is restrained upon abutting of the extending portion of the core back iron core against the radial outer surface of the tooth-shaped iron cores.

Furthermore, by making the extending portions of the core back iron cores adjacent to each other contact each other, and by mutually connecting the contact regions of the extending portions to each other using, for example, welding, it is possible to increase connecting force between each of the core back iron cores and each of the tooth-shaped iron cores, and the core back iron cores and the tooth-shaped iron cores are prevented from coming off in the circumferentially inward and outward directions.

In a stator according to an eighth aspect of the present invention, each of the tooth-shaped iron cores includes a recess at the radially outermost end thereof, with each of which one the extending portion of the core back iron core is engageable.

According to the stator constructed above, by the engagement of the extending portion of the core back iron core with the recess formed in the tooth-shaped iron core, the displacement of the core back iron core in the radially inward direction can be restrained. In addition to this, the radial-outer surface of the core back iron cores and the radial-outer surface of the tooth-shaped iron cores can be disposed so as to be smoothly connected to each other; therefore, for, example, a ring-shaped element that covers the radial-outer surface of the core back iron cores and the radial-outer surface of the tooth-shaped iron cores may be provided so that connecting force between the iron cores can be increased.

In a stator according to a ninth aspect of the present invention, each of the tooth-shaped iron cores includes a projecting portion projecting from a radial-middle region thereof, which is capable of abutting against a radial-inner end of one of the core back iron cores.

According to the stator constructed above, by providing the projecting portion of the tooth-shaped iron core that projects, for example, toward the adjacent tooth-shaped iron core, when each of the core back iron cores is inserted between the tooth-shaped iron cores adjacent to each other, the displacement of the core back iron core in the radially inward direction is restrained upon abutting of the radial-inner end of the core back iron core against the projecting portion of the tooth-shaped iron core, and thus the core back iron core can be located at a predetermined position.

Moreover, a decrease in a packing factor can be avoided by preventing the displacement of the stator windings toward the radial outside by making the stator windings that are wound on the tooth-shaped iron cores at the radial-inner region thereof abut against the projecting portion.

The present invention provides, as a tenth aspect, a method for manufacturing a stator including: a first step of disposing tooth-shaped iron cores, each of which is formed so that the circumferential width thereof is greater at a radial-outer region than at a radial-inner region, along a predetermined circumference at predetermined intervals; a second step of forming stator windings on the tooth-shaped iron cores by supplying the stator windings from a radial-outer area using plural nozzles that simultaneously supply plural stator windings; and a third step of inserting core back iron cores from an radial-outer area into spaces between the tooth-shaped iron cores adjacent to each other.

According to the method for manufacturing a stator, because the core back iron cores are inserted from a radial-outer area into spaces between the tooth-shaped iron cores adjacent to each other after forming the stator windings on the tooth-shaped iron cores, a decrease in a packing factor can be avoided. Moreover, by disposing tooth-shaped iron cores, each of which is formed so that the circumferential width thereof is greater at a radial-outer region than at a radial-inner region, so that the distance between the tooth-shaped iron cores adjacent to each other is set so as to decrease from a radial-inner region to a radial-outer region, or alternatively, is set to be a predetermined value over a range from a radial-inner region to a radial-outer region, connecting force between the cores back iron cores and the tooth-shaped iron cores can be increased, and thus the core back iron cores and the tooth-shaped iron cores can be prevented from coming off in the radial direction.

The present invention provides, as an eleventh aspect, a method for manufacturing a stator which includes: tooth-shaped iron cores disposed along a predetermined circumference at predetermined intervals; core back iron cores, each of which is disposed between the tooth-shaped iron cores at a radial-outer region; and stator windings formed by connecting, in a parallel a manner, bundles of wires, each of which includes plural wires inserted between the tooth-shaped iron cores. The method includes the steps of: winding the bundles of wires for plural phases plural times in a concentric manner while skipping a predetermined number of slots; and forming a braided portion by alternately braiding circumferential end portions of windings of one bundle of wires for one phase and circumferential beginning portions of windings of another bundle of wires for another phase.

According to the method for manufacturing a stator, a packing factor can be increased, the height of the coil end can be maintained to be less tall, and the magnetic flux can be made smooth.

The stator according to the present invention may include a ring-shaped element that covers the radial-outer surface of the core back iron cores and the radial-outer surface of the tooth-shaped iron cores.

According to the stator constructed above, the core back iron cores and the tooth-shaped iron cores can be prevented from coming off in the radial outer direction.

Moreover, in the stator according to the present invention, the extending portions of the core back iron cores adjacent to each other may be made to abut against each other, or may be made to be adjacent to each other, and the ends of the extending portions adjacent to each other may be connected to each other using welding.

According to the stator constructed above, it is possible to increase connecting force between each of the core back iron cores and each of the tooth-shaped iron cores, and the iron cores are more reliably prevented from coming off in the circumferentially inward and outward directions.

Moreover, in the stator according to the present invention, an engagement portion, which is formed by engaging the extending portion of the core back iron core with the recess of the tooth-shaped iron core, may be welded.

According to the stator constructed above, it is possible to increase connecting force between each of the core back iron cores and each of the tooth-shaped iron cores, and the iron cores are more reliably prevented from coming off in the circumferentially inward and outward directions. In addition, the radial-outer surface of the core back iron cores and the radial-outer surface of the tooth-shaped iron cores can be disposed so as to be smoothly connected to each other.

Moreover, in the stator according to the present invention, the core back iron cores and the tooth-shaped iron cores may be made of grain-oriented magnetic steel plates, the core back iron cores may be magnetized in the radial direction of the stator, and the tooth-shaped iron cores may be magnetized in the circumferential direction of the stator.

According to the stator constructed above, the flow of magnetic flux in the magnetic circuit formed by the core back iron cores and the tooth-shaped iron cores can be made smooth, and iron loss can be reduced, and thus the magnetic characteristics of the stator can be improved.

Moreover, in the stator according to the present invention, the tooth-shaped iron cores may be made of multi-direction grain-oriented magnetic steel plates, and the tooth-shaped iron cores may be magnetized in the circumferential direction and radial direction of the stator.

According to the stator constructed above, the flow of magnetic flux in the magnetic circuit formed by the core back iron cores and the tooth-shaped iron cores, in particular, the flow of magnetic flux in the vicinity of the abutting portion between the core back iron core and the tooth-shaped iron core, can be made smooth, and thus the magnetic characteristics of the stator can be further improved.

PREFERRED EMBODIMENTS OF THE INVENTION

Embodiments of a stator according to the present invention will be explained below with reference to appended drawings.

Figure 1:
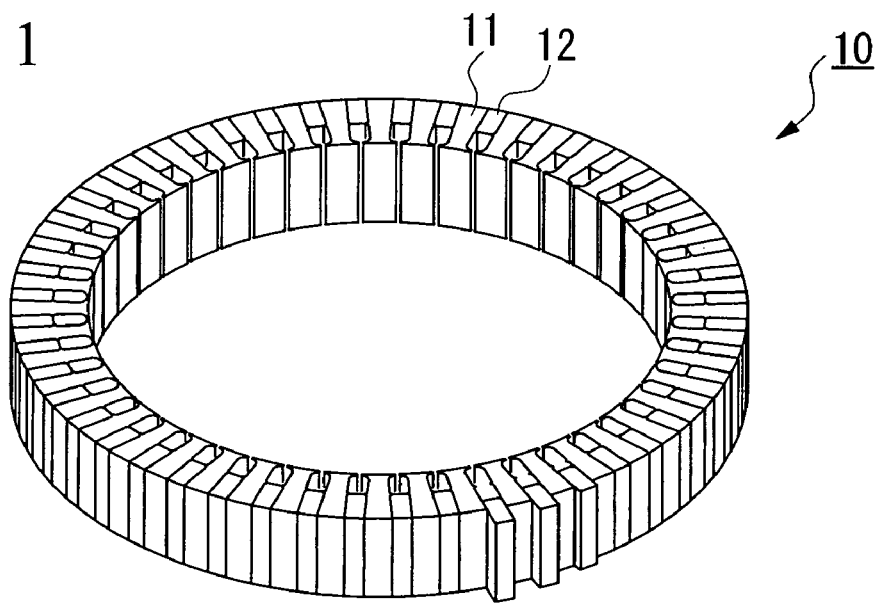
FIG. 1 is a perspective view showing a stator according to a first embodiment of the present invention.
Figure 2:
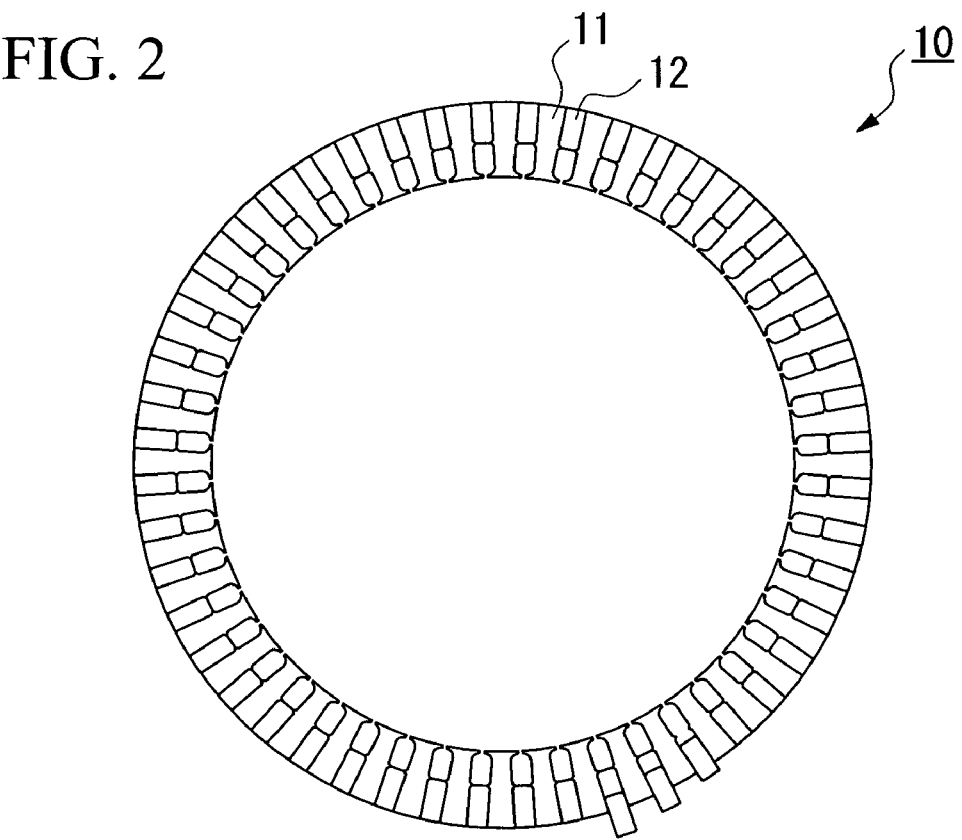
FIG. 2 is a plan view showing the stator shown in FIG. 1.
Figure 3:
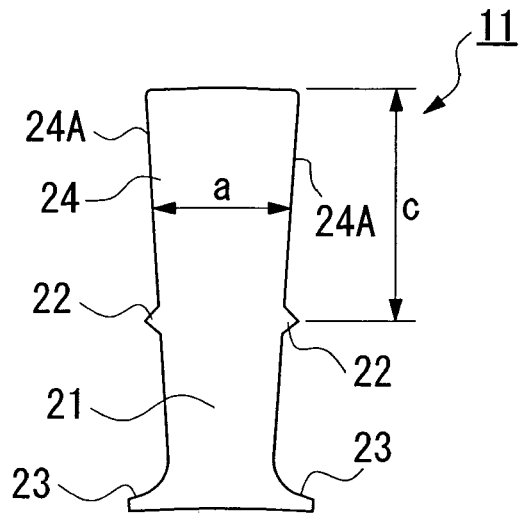
FIG. 3 is a cross-sectional view showing a tooth-shaped iron core of the stator shown in FIG. 1.
Figure 4:
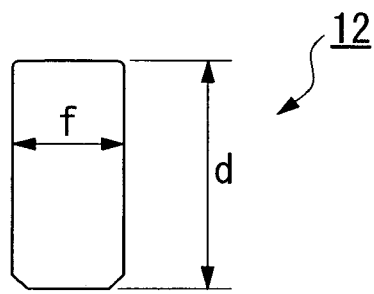
FIG. 4 is a cross-sectional view showing a core back iron core of the stator shown in FIG. 1.
Figure 5:
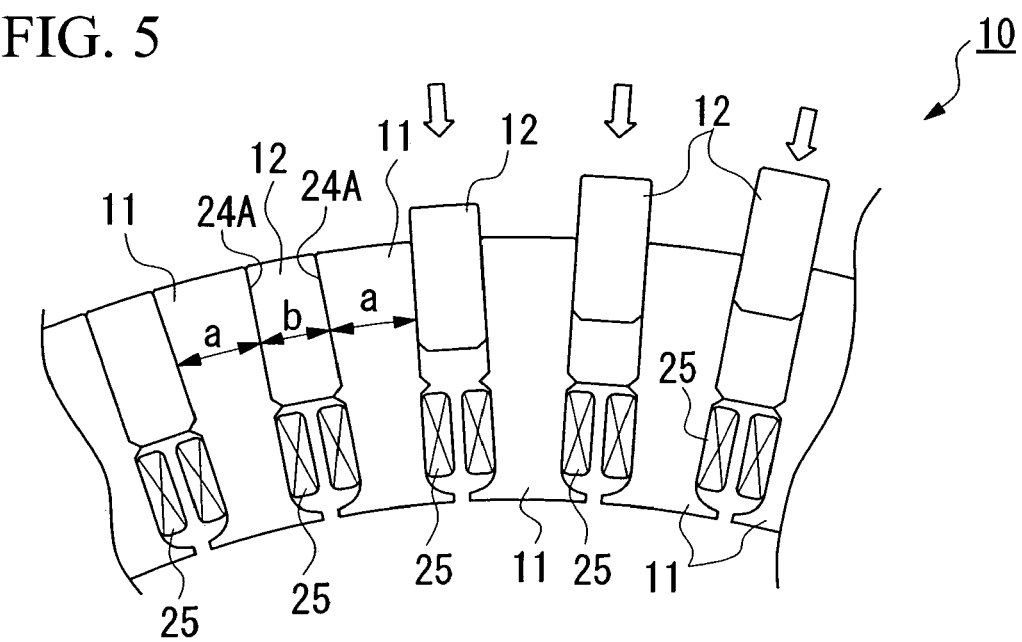
FIG. 5 is a plan view showing the main portion of the stator shown in FIG. 2.

FIG. 1 is a perspective view showing a stator 10 as a first embodiment of the present invention, FIG. 2 is a plan view showing the stator 10 shown in FIG. 1, FIG. 3 is a cross-sectional view showing a tooth-shaped iron core 11 of the stator 10 shown in FIG. 1, FIG. 4 is a cross-sectional view showing a core back iron core 12 of the stator 10 shown in FIG. 1, and FIG. 5 is a plan view showing the main portion of the stator 10 shown in FIG. 2.

The stator 10 according to the present embodiment is formed in a substantially cylindrical shape as shown in, for example, FIGS. 1 and 2, and includes tooth-shaped iron cores 11, . . . , and 11 disposed along a predetermined circumference at predetermined intervals, core back iron cores 12, . . . , and 12, each of which is disposed between the tooth-shaped iron cores 11, . . . , and 11 adjacent to each other.

As shown in, for example, FIG. 3, the tooth-shaped iron core 11 is formed by stacking grain-oriented magnetic steel plates, such as silicon steel plates, and in which an easy direction of magnetization is set, for example, in the radial direction of the stator 10.

The tooth-shaped iron core 11 has predetermined thickness in the direction parallel to the central axis of the stator 10, and includes a portion-for-winding 21 that is disposed at a radial-inner region, a pair of projecting portions 22 and 22, a pair of fingers 23 and 23, and yoke 24 that is disposed at a radial-outer region.

The portion-for-winding 21 is formed so as to have predetermined width in the circumferential direction. The portion-for-winding 21 is provided with, at the radially outermost region thereof, the pair of projecting portions projecting outside in the circumferential direction, and is provided with, at the radially innermost region thereof, the pair of fingers projecting outside in the circumferential direction.

Two projecting portions 22 and 22, which opposes each other in a space between the tooth-shaped iron cores 11 and 11 adjacent to each other, are formed so as to be able to abut against the radial-inner ends of the core back iron core 12 disposed between the tooth-shaped iron cores 11 and 11, so that the displacement of the core back iron core 12 in the radially inward direction is restrained.

In addition, two fingers 23 and 23 of the portion-for-winding 21 are formed so as to prevent stator windings (not shown) from coming off in the radially inward direction.

The yoke 24 is formed such that the width thereof in the circumferential direction at a radial-outer region is set to be greater than that at a radial-inner region, and has, for example, tapered yoke side faces 24A and 24A. More specifically, the distance "a" between the yoke side faces 24A and 24A is set so as to gradually increase from a radial-inner region to a radial-outer region.

As shown in, for example, FIG. 5, the distance "b" between two yoke side faces 24A and 24A opposing each other and facing a space between the tooth-shaped iron cores 11 and 11 that are disposed along a predetermined circumference with a predetermined interval is set to be a predetermined value over a range from a radial-inner region to a radial-outer region, or alternatively, the distance "b" may be set so as to slightly decrease from a radial-inner region to a radial-outer region.

As shown in, for example, FIG. 4, the core back iron core 12 is formed, in a substantially rectangular parallelepiped shape, by stacking grain-oriented magnetic steel plates, such as silicon steel plates, and in which an easy direction of magnetization is set in the circumferential direction of the stator 10.

The thickness of the core back iron core 12 is set to be, for example, substantially the same as that of the tooth-shaped iron core 11, and the length "d" in the radial direction is set to be, for example, substantially the same as the length "c", in the radial direction, of the yoke 24 of the tooth-shaped iron core 11.

Moreover, the width "f" of the core back iron core 12 in the circumferential direction is set to be a predetermined value over a range from a radial-inner region to a radial-outer region, for example, is set to be substantially the same as the distance "b" between two yoke side faces 24A and 24A opposing each other and facing a space between the tooth-shaped iron cores 11 and 11 adjacent to each other, or alternatively, the width "f" may be set to be slightly greater than the distance "b".

When the distance "b" between the yoke side faces 24A and 24A is set so as to decrease from a radial-inner region to a radial-outer region, the core back iron core 12 that is press-fitted into a space between the tooth-shaped iron cores 11 and 11 adjacent to each other is fixed by being sandwiched by, in particular, the radial-outer regions of the yoke side faces 24A and 24A.

On the other hand, when the distance "b" between the yoke side faces 24A and 24A is set to be a predetermined value over a range from a radial-inner region to a radial-outer region, the side faces of the core back iron core 12 have surface contact with the yoke side faces 24A and 24A, and the core back iron core 12 can be fixed by sandwiching the core back iron core 12 by the entire surfaces of the yoke side faces 24A and 24A.

Figure 6:
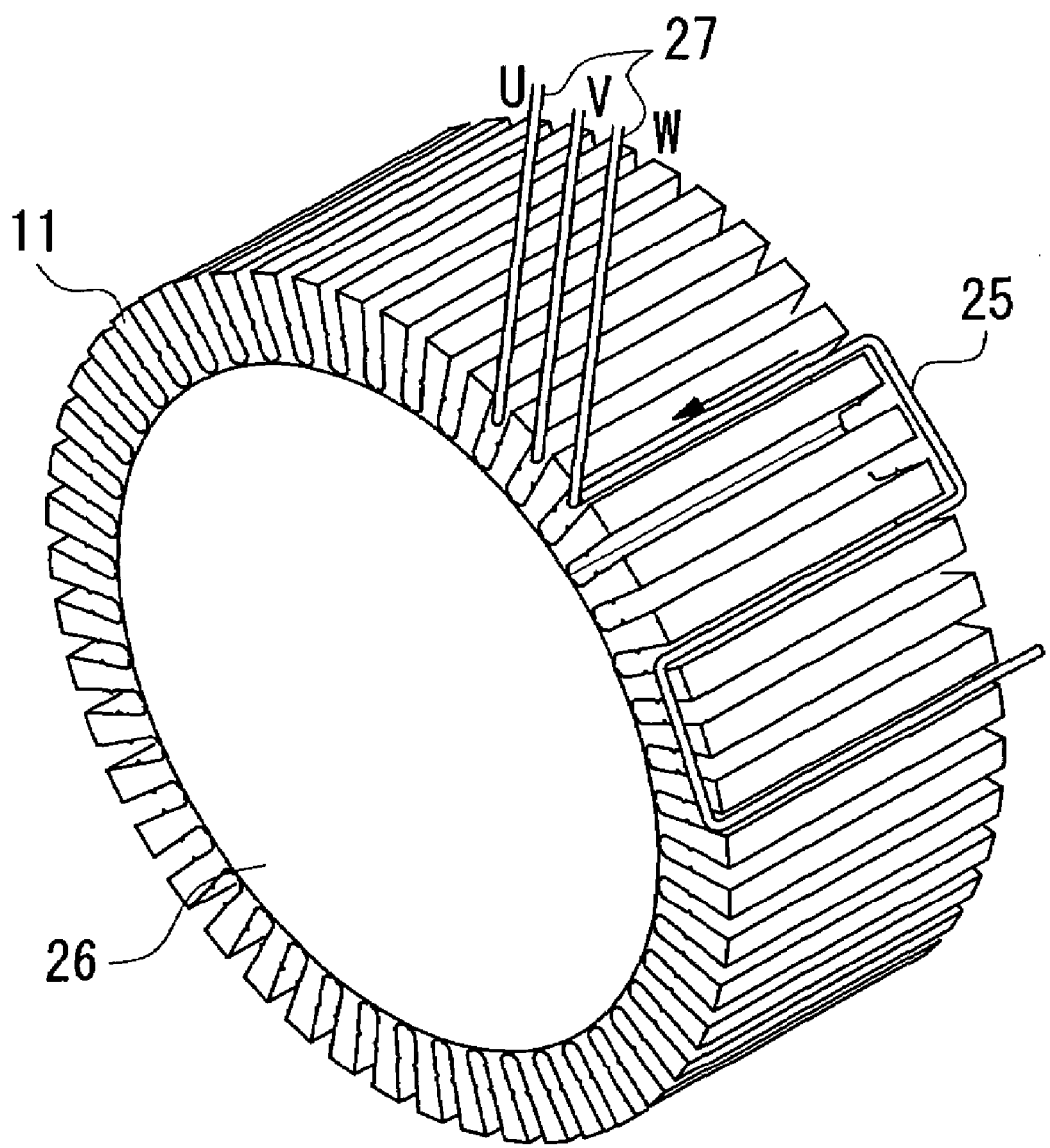
FIG. 6 is a diagram showing a process for winding stator windings on the tooth-shaped iron cores that are disposed at predetermined intervals therebetween.
Figure 7:
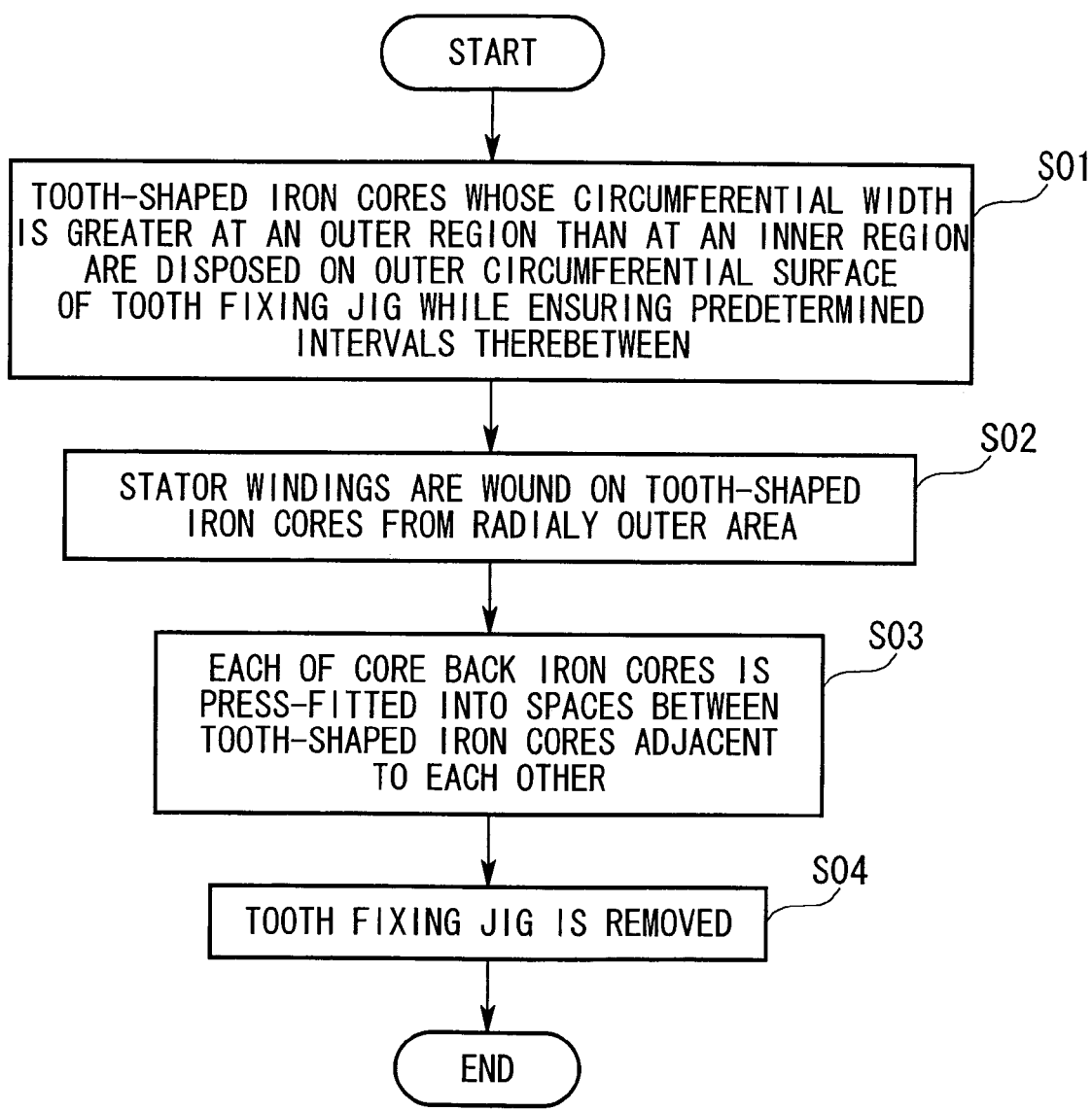
FIG. 7 is a process diagram showing a method for manufacturing the stator shown in FIG. 1.

The stator 10 according to the present embodiment has above-described structure. Next, a method for manufacturing the stator 10 will be explained with reference to the appended drawings. FIG. 6 is a diagram showing a process in which stator windings 25 are wound on the tooth-shaped iron cores 11, . . . , and 11 that are disposed at predetermined intervals, and FIG. 7 is a process diagram showing a method for manufacturing the stator 10.

First, as shown in, for example, FIG. 6, the tooth-shaped iron cores 11, . . . , and 11 are disposed, while ensuring predetermined intervals therebetween, on the outer circumferential surface of a tooth fixing jig 26 having a substantially cylindrical shape (step S01).

Next, the stator windings 25 are wound on the portion-for-winding 21 of each of the tooth-shaped iron cores 11 while supplying a bundle of the stator windings 25 from each of nozzles 27, . . . , and 27 of an appropriate winding apparatus (not shown) (step S02). The nozzles 27, . . . , and 27 are made movable along the outer circumferential surface of the tooth-shaped iron cores 11, . . . , and 11 that are fixed on the tooth fixing jig 26, as well as capable of reciprocating in a direction parallel to the axis of the stator 10.

For this winding operation, the winding apparatus is configured such that the nozzle 27 runs in a zigzag manner while skipping a predetermined number of tooth-shaped iron cores 11, . . . , and 11, and at the same time, the nozzle 27 turns along the circumference so as to wind the stator windings 25 on the tooth-shaped iron cores 11, and so that the stator windings 25 of each phase are disposed in the same spaces between the tooth-shaped iron cores 11, . . . , and 11 at every turn. The nozzle 27 includes the same number of nozzles 27, . . . , and 27 as the number of the phases of the stator windings 25, . . . , and 25 that are to be wound on the stator 10, and in the case of a three-phase motor, three nozzles 27, 27, and 27 are provided respectively corresponding to U-phase, V-phase, and W-phase. A bundle of stator windings 25, . . . , and 25 are supplied from each nozzle 27, and three nozzles 27, 27, and 27 are simultaneously made to run in a zigzag manner through the spaces between the tooth-shaped iron cores 11, . . . , and 11 while turning along the circumference. In this manner, when the nozzles 27, 27, and 27 complete plural turns, multi-phase (e.g., U-phase, V-phase, and W-phase) windings are completed.

As explained above, because plural stator windings 25, . . . , and 25 are supplied from each nozzle 27, and plural nozzles 27, 27, and 27, which are disposed so as to have predetermined spaces therebetween, are simultaneously made to run in a zigzag manner through the spaces between the tooth-shaped iron cores 11, . . . , and 11 while turning along the circumference so that stator windings 25 are wound, it is possible to reduce the time for winding the stator windings 25, as well as to increase a packing factor.

Next, as shown in, for example, FIG. 5, each of the core back iron cores 12 is press-fitted into each space between the tooth-shaped iron cores 11 and 11 adjacent to each other from a radially outer area, and the radial-inner ends of the core back iron core 12 are made to abut against two projecting portions 22 and 22 opposing each other and facing a space between the tooth-shaped iron cores 11 and 11 adjacent to each other (step S03).

Then, the tooth fixing jig 26 is removed (step S04), so that a series of the processes is completed.

As described above, in the stator 10 according to the present embodiment, because the circumferential width of the yoke 24 of each of the tooth-shaped iron cores 11 at a radial-outer region is set to be greater than that at a radial-inner region, when plural tooth-shaped iron cores 11, . . . , and 11 are disposed in the circumferential direction of a predetermined circumference at predetermined intervals, the distance between the yokes 24 and 24 of the tooth-shaped iron cores 11 and 11 adjacent to each other can be set so as to decrease from a radial-inner region to a radial-outer region, or alternatively, can be set to be a predetermined value over a range from a radial-inner region to a radial-outer region.

As a result, the core back iron core 12 that is press-fitted into a space between the tooth-shaped iron cores 11 and 11 adjacent to each other is fixed by being sandwiched by the yoke side faces 24A and 24A, and thus the core back iron cores 12, . . . , and 12 and the tooth-shaped iron cores 11, . . . , and 11 can be prevented from coming off in the radial direction.

Moreover, according to the above-described method of the present embodiment for manufacturing a stator, because the core back iron core 12 is press-fitted into a space between the tooth-shaped iron cores 11 and 11 from a radially outer area after the stator windings are wound on the tooth-shaped iron cores 11, reduction in a packing factor of the stator windings can be prevented.

Furthermore, because the distance "b" between two yoke side faces 24A and 24A opposing each other and facing a space between the tooth-shaped iron cores 11 and 11 adjacent to each other is set to be a predetermined value over a range from a radial-inner region to a radial-outer region, or alternatively, the distance "b" is set so as to slightly decrease from a radial-inner region to a radial-outer region, the tooth-shaped iron cores 11, . . . , and 11 and the core back iron cores 12, . . . , and 12, each of which is press-fitted into a space between the tooth-shaped iron cores 11 and 11, can be prevented from coming off in the radial direction.

In the above embodiment, the stator 10 is formed by press-fitting each of the core back iron cores 12, . . . , and 12 into a space between the tooth-shaped iron cores 11 and 11; however, in addition to this configuration, for example, the tooth-shaped iron cores 11, . . . , and 11 and the core back iron cores 12, . . . , and 12 may be press-fitted into an appropriate ring-shaped element.

In this case, the tooth-shaped iron cores 11, . . . , and 11 and the core back iron cores 12, . . . , and 12 can be prevented from coming off in the radial outer direction.

Figure 8:
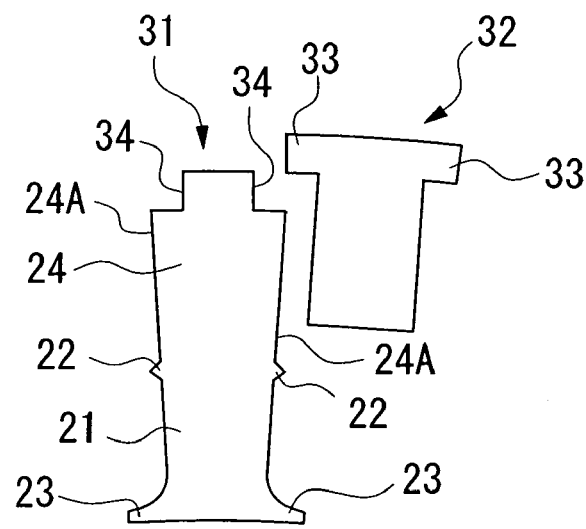
FIG. 8 is a cross-sectional view showing a tooth-shaped iron core and a core back iron core of a stator according to a second embodiment of the present invention.

In the above embodiment, a tooth-shaped iron core 31 and a core back iron core 32 according to a second embodiment of the stator 10 shown in, for example, FIG. 8 may be employed. The core back iron core 32 may include a pair of extending portions 33 and 33, each of which extends from the radially outermost end of the core back iron core 32 to the outside in the circumferential direction. The tooth-shaped iron core 31 may be provided with recesses 34 at the radially outermost ends thereof, with each of which one of the extending portions 33 of the core back iron core 32 can be engaged.

In this case, the displacement of the core back iron core 32 in the radially inward direction can be restrained by the engagement of the extending portion 33 of the core back iron core 32 with the recess 34 in the tooth-shaped iron core 31.

Figure 9:
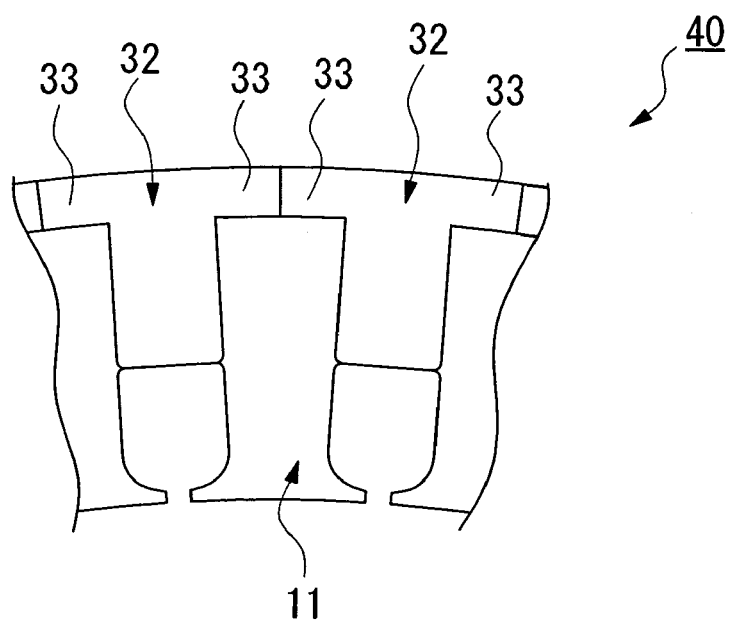
FIG. 9 is a cross-sectional view showing tooth-shaped iron cores and core back iron cores of a stator according to a third embodiment of the present invention.

Moreover, as shown in, for example, FIG. 9, which is a plan view showing the main portion of a stator 40 according to a third embodiment of the present invention, the core back iron core 32 may include a pair of extending portions 33 and 33, each of which extends from the radially outermost end of the core back iron core 32 to the outside in the circumferential direction, in such a manner that the extending portions 33 and 33 of the core back iron cores 32 and 32 adjacent to each other are made to abut against each other, or are made to be adjacent to each other, so that the outer surface of the tooth-shaped iron core is covered by the extending portions 33 and 33.

In this case, by mutually connecting the ends of the extending portions 33 and 33 adjacent to each other using, for example, welding, it is possible to increase connecting force between each of the core back iron cores 32, . . . , and 32 and each of the tooth-shaped iron cores 11, . . . , and 11, and the core back iron cores 32, . . . , and 32 and the tooth-shaped iron cores 11, . . . , and 11 are prevented from coming off in the circumferentially inward and outward directions.

In the above embodiments, an easy direction of magnetization of the tooth-shaped iron core 11 is set in the radial direction of the stator 10; however, an easy direction of magnetization may be set, for example, in the radial direction and in the circumferential direction of the stator 10.

In this case, the flow of magnetic flux in the magnetic circuit formed by the core back iron cores 12, . . . , and 12 and the tooth-shaped iron cores 11, . . . , and 11, in particular, the flow of magnetic flux in the vicinity of the abutting portion between the core back iron core 12 and the tooth-shaped iron core 11, can be made smooth, and thus the magnetic characteristics of the stator 10 can be further improved.

Next, a fourth embodiment of the present invention will be explained.

Figure 10:
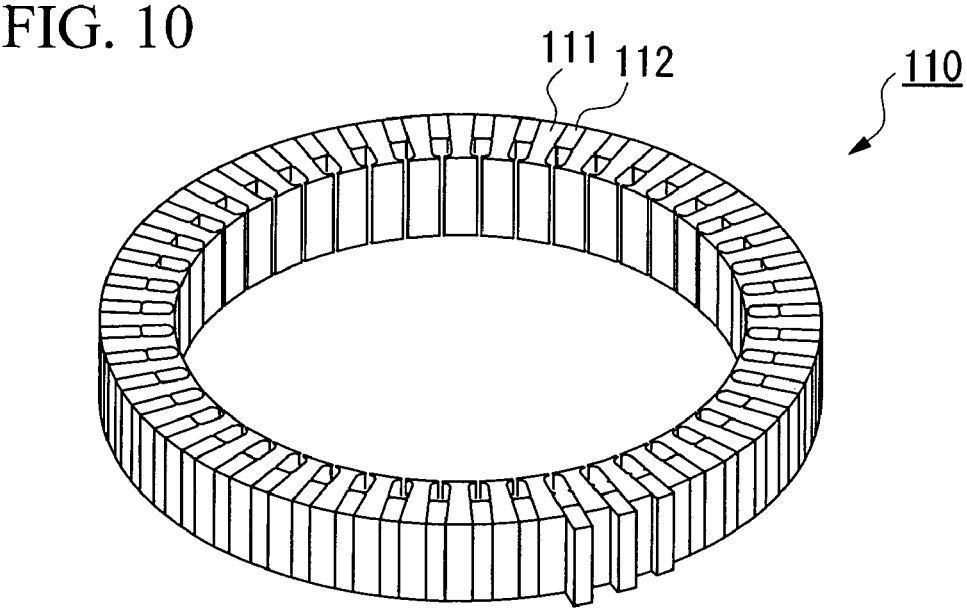
FIG. 10 is a perspective view showing a stator in a fourth embodiment of the present invention.
Figure 11:
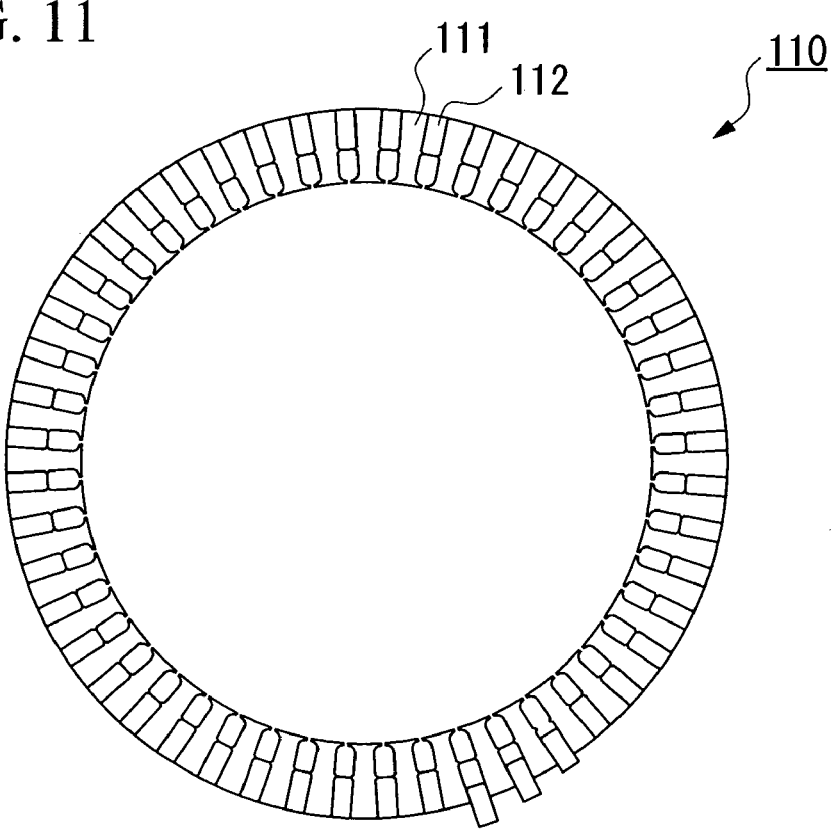
FIG. 11 is a plan view showing the stator shown in FIG. 10.

FIG. 10 is a perspective view showing a stator 110 in the fourth embodiment of the present invention. FIG. 11 is a plan view showing the stator 110 shown in FIG. 10. As shown in FIG. 10 or FIG. 11, the stator 110 according to the present embodiment is formed in a substantially cylindrical shape, and includes tooth-shaped iron cores 111 radially disposed along a predetermined circumference at predetermined intervals, core back iron cores 112, each of which is disposed between the tooth-shaped iron cores 111 and 111 adjacent to each other.

The tooth-shaped iron core 111 has predetermined thickness in the direction parallel to the central axis of the stator 110, and includes a portion-for-winding 119 which is disposed at a radial-inner region, and on which stator windings 116 are wound, and yoke 121 which is disposed at a radial-outer region, and which is abutted or pressed against the core back iron core 112.

The tooth-shaped iron core 111 is formed in a tapered shape such that the width thereof in the circumferential direction at a radial-outer region is set to be greater than that at a radial-inner region. Accordingly, the probability of displacement of the tooth-shaped iron core 111, which is disposed between the core back iron cores 112 and 112, in the radial direction, can be reduced, and thus stability can be increased.

The tooth-shaped iron core 111 is formed by stacking grain-oriented magnetic steel plates, such as silicon steel plates, and in which an easy direction of magnetization is set in the radial direction of the stator. The core back iron core 112 is formed, in a substantially rectangular parallelepiped shape, by stacking grain-oriented magnetic steel plates, such as silicon steel plates, and in which an easy direction of magnetization is set in the circumferential direction of the stator.

Figure 12:
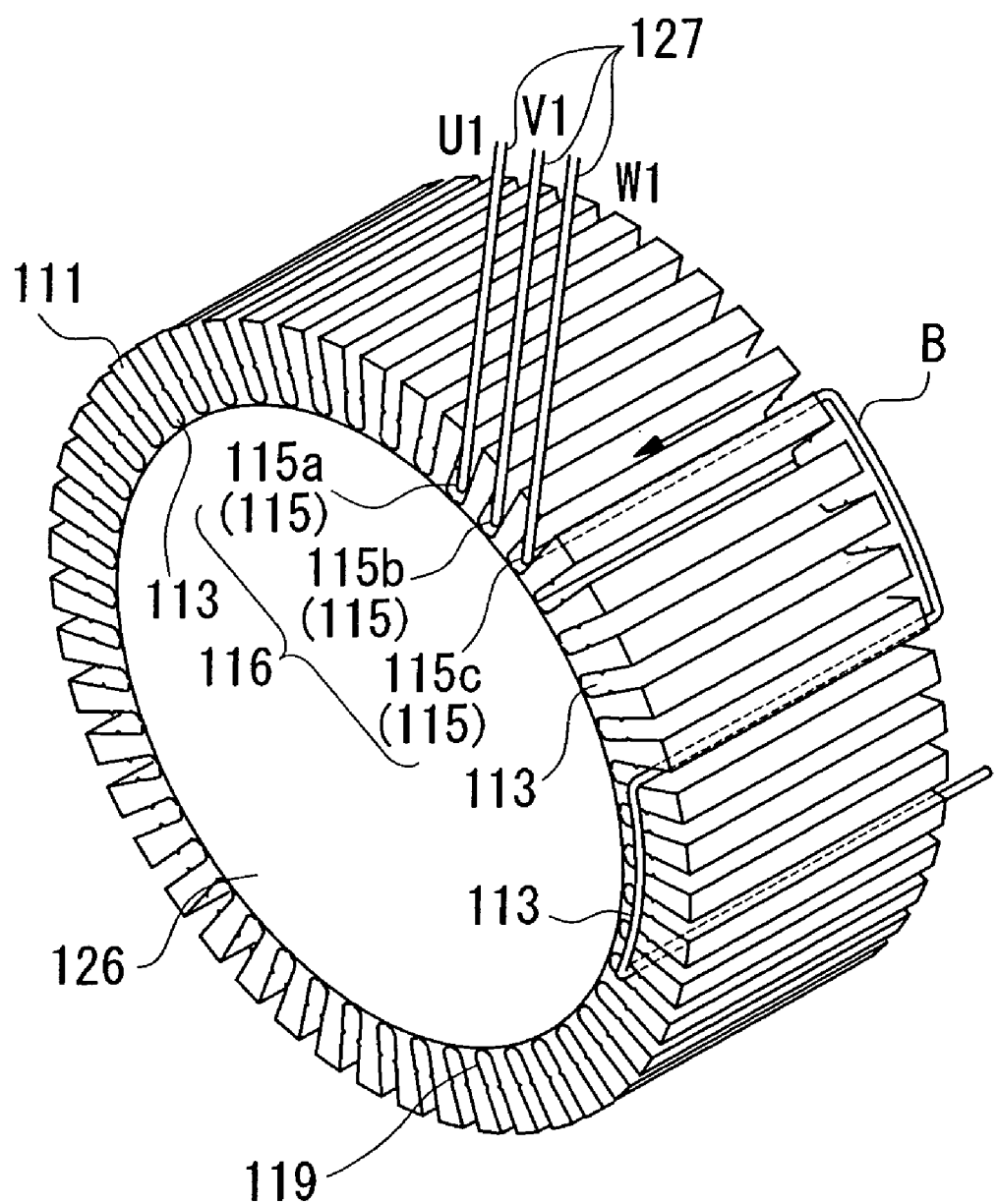
FIG. 12 is a diagram showing a process for winding the stator windings on the tooth-shaped iron cores that are disposed so as to have predetermined gaps therebetween.

As shown in, for example, FIG. 12, stator windings 116 are wound on the portion-for-winding 119 of each of the tooth-shaped iron cores 111. The stator windings 116 include bundles of wires 115, each of which has plural wires, connected to each other in a parallel manner. Each of the bundles of wires 115 turns around the stator 110 plural times (e.g., 5 times). In the present embodiment, each of the bundles of wires 115 (115a, 115b, and 115c) corresponding to three phases is wound plural times in a concentric manner at six-slot (113) interval. As constructed in this manner, tension at a radial-outer region in each of the bundles of wires 115 is substantially equal to that at a radial-inner region. Accordingly, the bundles of wires 115 can be wound so as to firmly contact with the portion-for-winding 119 of each of the tooth-shaped iron cores 111.

Figure 16:
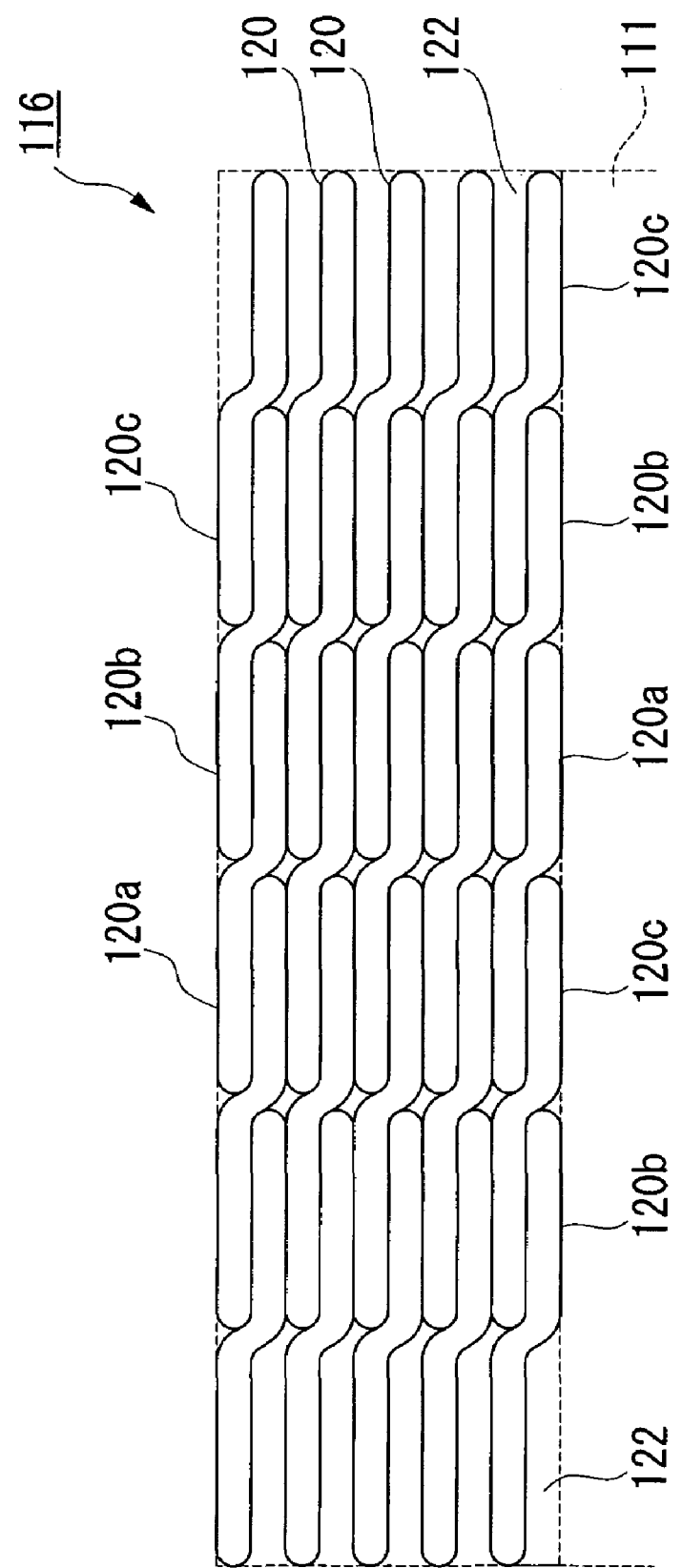
FIG. 16 is a partial deployment view showing the stator having windings that are formed using the method shown in FIG. 13.

Moreover, as shown in FIG. 16, a braided portion 118 is provided, which is formed by alternately braiding circumferential end portions of windings of one bundle of wires (e.g., the bundle of wires 115a) and circumferential beginning portions of windings of another bundle of wires (e.g., the bundle of wires 115b). As constructed in this manner, an increase in height of the coil ends due to overlapping of the beginning portions and the end portions of bundles of wires 115 is avoided, which occurs in conventional cases (the details will be explained below).

In addition, in each of the bundles of wires 115 for each phase, the bundles of wires 115 located at the radial-inner region of the spaces between tooth-shaped iron cores 111 and 111 include wires which are thinner than those included in the bundles of wires 115 located at the radial-outer region.

In other words, at a radial-outer position with respect to a bundle of wires 115 formed by bundling a predetermined number of turn-around wires, another bundle of wires 115 formed by bundling wires having greater diameter is disposed.

The diameters of wires are determined depending on, for example, a circumferential length L of the bundle of wires and a cross-sectional area A of the bundle of wires.

Figure 17:
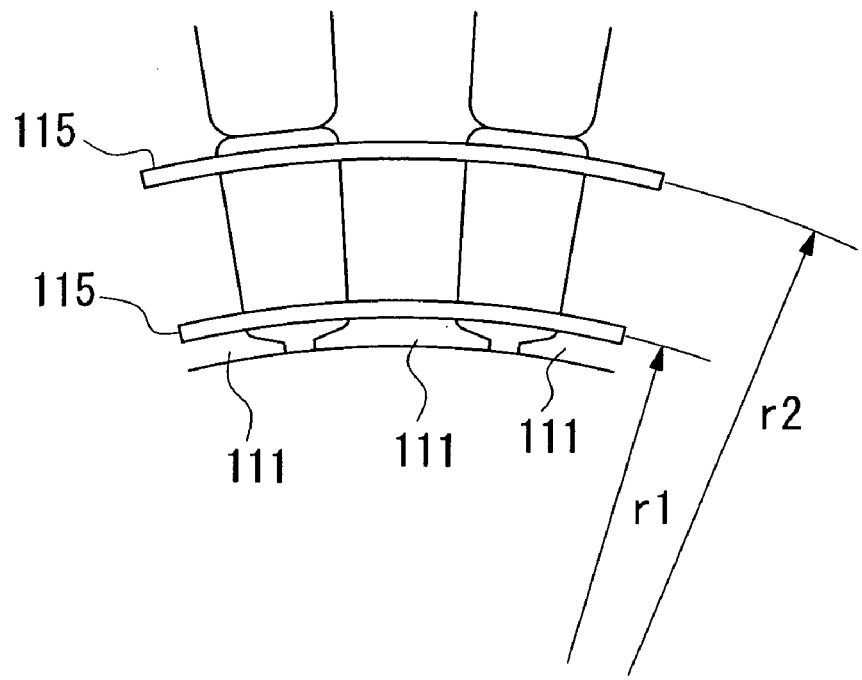
FIG. 17 is a cross-sectional view showing the main portion of the stator shown in FIG. 12.
Figure 18:
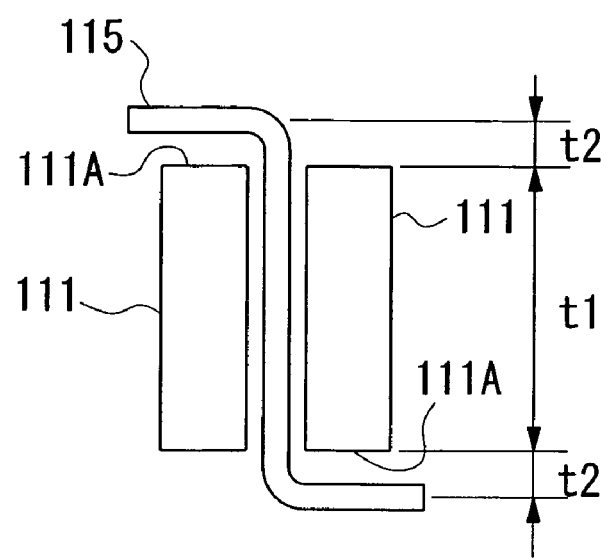
FIG. 18 is a diagram showing, as viewed from the outside in the radial direction, the main portion of the stator shown in FIG. 12.
Figure 19:
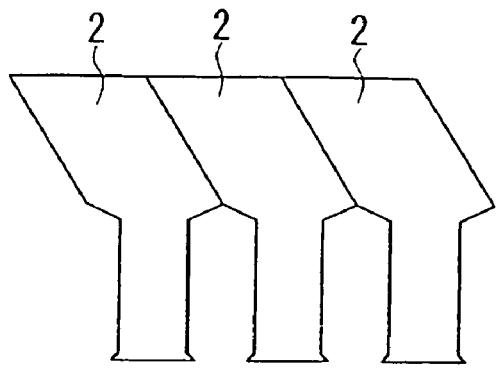
FIG. 19 is a plan view showing the main portion of a stator as an example of prior art.
Figure 20:
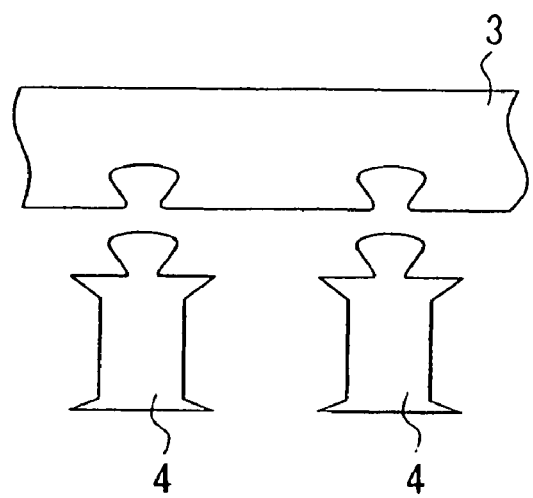
FIG. 20 is a plan view showing the main portion of a stator as another example of prior art.
Figure 21:
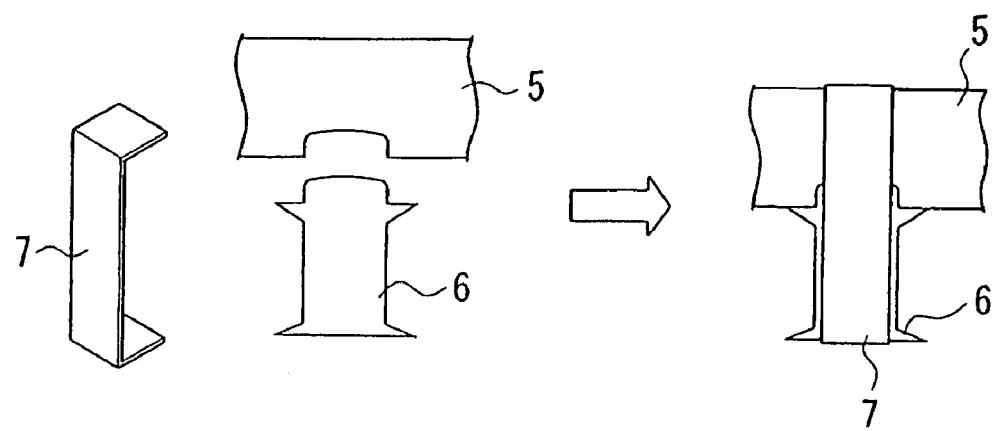
FIG. 21 is a plan view showing the main portion of a stator as another example of prior art.
Figure 22:
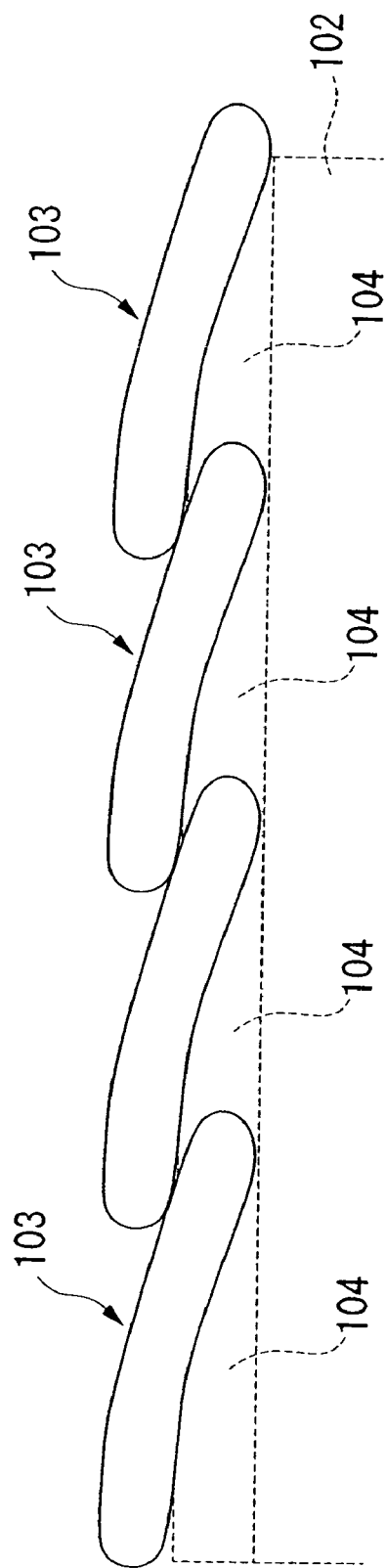
FIG. 22 is a deployment view showing a stator in prior art.

As shown in, for example, FIG. 12, when each of the bundle of wires 115 is wound while running through the spaces between the tooth-shaped iron cores 111 and 111 in a zigzag manner, i.e., in a wave winding manner, the circumferential length L of the bundle of wires 115 for a phase per one turn is expressed in following Equation (1), $$L=(t1+2\times t2)\times P+2\pi\times r \quad \text{Equation (1)},$$

where "r" is radius of the bundle of wires 115 which depends on radial position in the spaces between the tooth-shaped iron cores 111 and 111 (e.g., a radius r1 of the radial-inner bundle of wires 115 and a radius r2 of the radial-outer bundle of wires 115, shown in FIG. 17), P is the number of poles, t1 is thickness of stacking (e.g., the thickness t1 of the tooth-shaped iron core 111, shown in FIG. 17), and t2 is height of the coil end (e.g., the distance t2 between a side face 111A of the tooth-shaped iron core 111 and stator windings 116, as shown in FIG. 18).

The ratio (L/A) of the circumferential length L that is calculated using Equation (1) and the cross-sectional area A, which corresponds to the electrical resistance of the bundle of wires 115, is set to be in an allowable range for each of the bundles of wires 115.

As constructed in this manner, the electrical resistances of the bundles of wires 115 can be set substantially the same regardless of radial position between the tooth-shaped iron cores 111 and 111 adjacent to each other, as the details will be explained below; therefore, resistance loss in the stator 110 can be restrained to be low, and operational efficiency of a motor incorporating the stator 110 can be increased.

Figure 13:
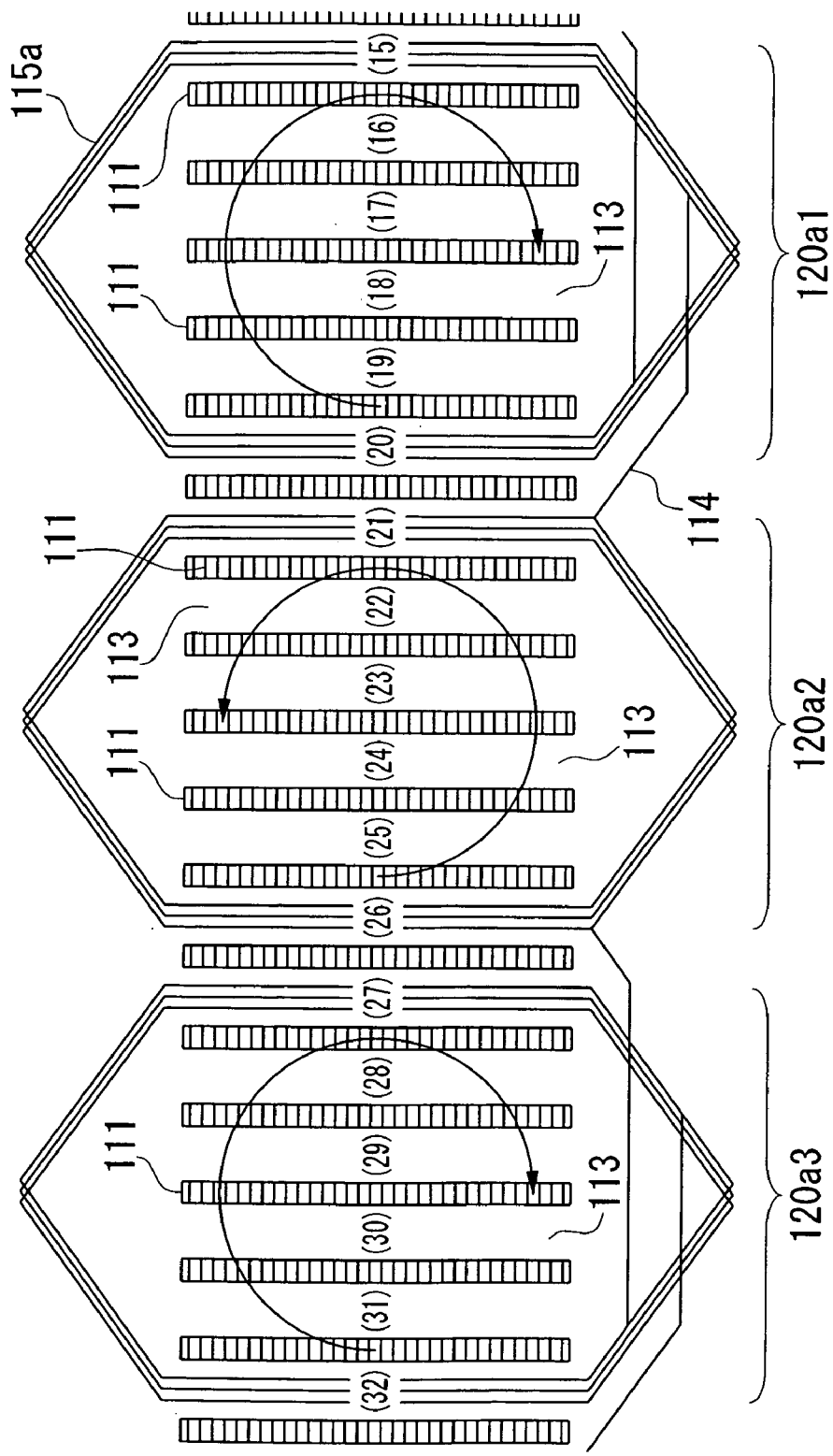
FIG. 13 is a partial deployment view showing, as viewed in the radial direction, a method for manufacturing the stator according to the fourth embodiment.

Moreover, as shown in FIG. 13, the bundle of wires 115 corresponding to one phase includes bundle units 120 which are wound plural times in a concentric manner. With regard to the bundle units 120 adjacent to each other for one phase, the beginning portions of winding are separated from each other by an amount corresponding to a predetermined number of slots (e.g., 6 slots), and the winding directions are set opposite with respect to each other. As constructed in this manner, the probability of twisting of the bundle of wires 115 that connects the adjacent bundle units 120 to each other can be reduced, and degree of freedom in forming the bundle unit 120 can be increased, and thus a packing factor can be further increased (the details will be explained below).

A method for manufacturing the stator 110 having the above-described structure will be explained below.

First, as shown in, for example, FIG. 12, the tooth-shaped iron cores 111, . . . , and 111 are disposed, while ensuring predetermined intervals therebetween, on the outer circumferential surface of a tooth fixing jig 126 having a substantially cylindrical shape.

Next, the bundles of wires stator windings 115 are wound on the portion-for-winding 119 of each of the tooth-shaped iron cores 111 while supplying the bundle of wires 115 formed by bundling plural wires from each of nozzles 127, . . . , and 127 of an appropriate winding apparatus (not shown). The nozzles 127, . . . , and 127 are made movable along the outer circumferential surface of the tooth-shaped iron cores 111, . . . , and 111 that are fixed on the tooth fixing jig 126, as well as capable of reciprocating in a direction parallel to the axis of the stator 110.

In this winding operation, the nozzle 127 runs in a zigzag manner while skipping a predetermined number of tooth-shaped iron cores 111, . . . , and 111, and at the same time, the nozzle 127 turns around the circumference plural times so as to wind the bundle of wires 115 on the tooth-shaped iron cores 111, and so that the bundle units 120 are formed. With regard to the bundle units 120 adjacent to each other for one phase, the beginning portions of winding are separated from each other by an amount corresponding to a predetermined number of slots (e.g., 6 slots), and the winding directions are set opposite with respect to each other.

FIG. 13 is a partial deployment showing, as viewed in the radial direction, a method for manufacturing the stator 110. In view of circumstances of illustration, only the bundle unit 120a for the U1-phase is shown, and the bundle unit 120b for the V1-phase and the bundle unit 120c for the W1-phase are omitted. The bundle of wires 115 forming the bundle unit 120a includes three wires.

The bundle of wires 115a is guided in the clockwise direction so as to pass through the $15^{th}$ and $20^{th}$ slots 113, so that the bundle unit 120a1 is formed. The bundle of wires 115a at the end of winding of the bundle unit 120a1 is guided in the counterclockwise direction so as to pass through the $21^{st}$ slot 113, the $26^{th}$ slot 113, the $21^{st}$ slot 113, and through the $26^{th}$ slot 113, so that the bundle unit 120a2 is formed. Similarly, the bundle of wires 115a at the end of winding of the bundle unit 120a2 which has passed through the $26^{th}$ slot 113, is guided in the clockwise direction so as to pass through the $32^{nd}$ slot 113, the $27^{th}$ slot 113, and the $32^{nd}$ slot 113, so that the bundle unit 120a3 is formed. Then, these processes are repeated.

When the winding directions of the bundle units 120a adjacent to each other (120a1, 120a2, . . . ) are set opposite with respect to each other as in this embodiment, the bundle units 120a are relatively independent from each other. Therefore, a packing factor can be increased by moving one of the bundle units 120a in a radial-inner direction without shifting the positions of the bundle units 120a adjacent to each other. Accordingly, the probability of twisting of the bundle of wires 115 that connects the adjacent bundle units 120a to each other can be reduced, and reliability of the stator 110 can be improved. The same descriptions apply to the bundle units 120b and 120c for the other phases (V1-phase and W1-phase).

Even if there is some variation in the bundle units 120 (for example, the thickness at the beginning portion of winding is slightly greater than that at the end portion of winding), the variation can be cancelled overall when the winding directions of the bundle units adjacent to each other are set opposite with respect to each other; therefore, the bundles of wires 115 can be more uniformly wound.

Figure 14:
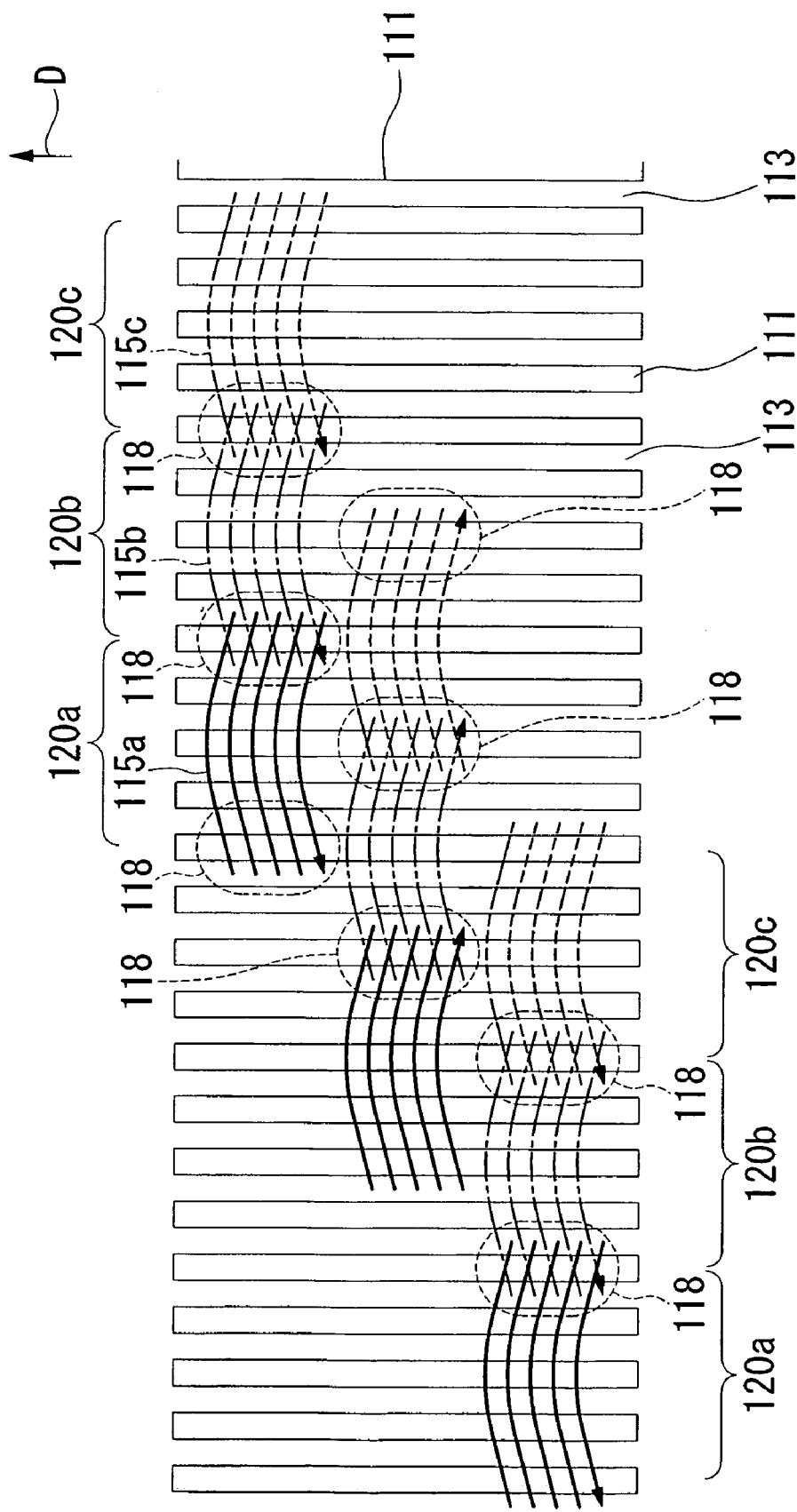
FIG. 14 is a partial deployment view showing, as viewed in a direction perpendicular to FIG. 13, a method for manufacturing the stator.

FIG. 14 is a schematic partial deployment showing, as viewed in a direction perpendicular to FIG. 13, the method for manufacturing the stator. The arrow D in FIG. 14 indicates a direction toward inner portions of the tooth-shaped iron cores 111 (i.e., toward the center). As shown in FIG. 14, the bundle of wires 115a, 115b, and 115c respectively corresponding to U1-phase, V1-phase, and W1-phase are wound plural times through the slots 113 while moving from a radial-inner region to a radial-outer region, so as to form the bundle units 120a, 120b, and 120c. The circumferential end portions of winding of one bundle of wires (e.g., the bundle of wires 115b) and the circumferential beginning portions of winding of the adjacent bundle of wires (e.g., the bundle of wires 115a) are alternately braided so as to form the braided portion 118. By making the beginning portions of winding and the end portions of winding of each of the bundles of wires 115 overlap each other as described above, the height of the coil end can be maintained to be less tall while ensuring a high packing factor. In addition, because wires of the phases are simultaneously wound in the same direction with respect to each other, the winding process can be simplified.

Figure 15:
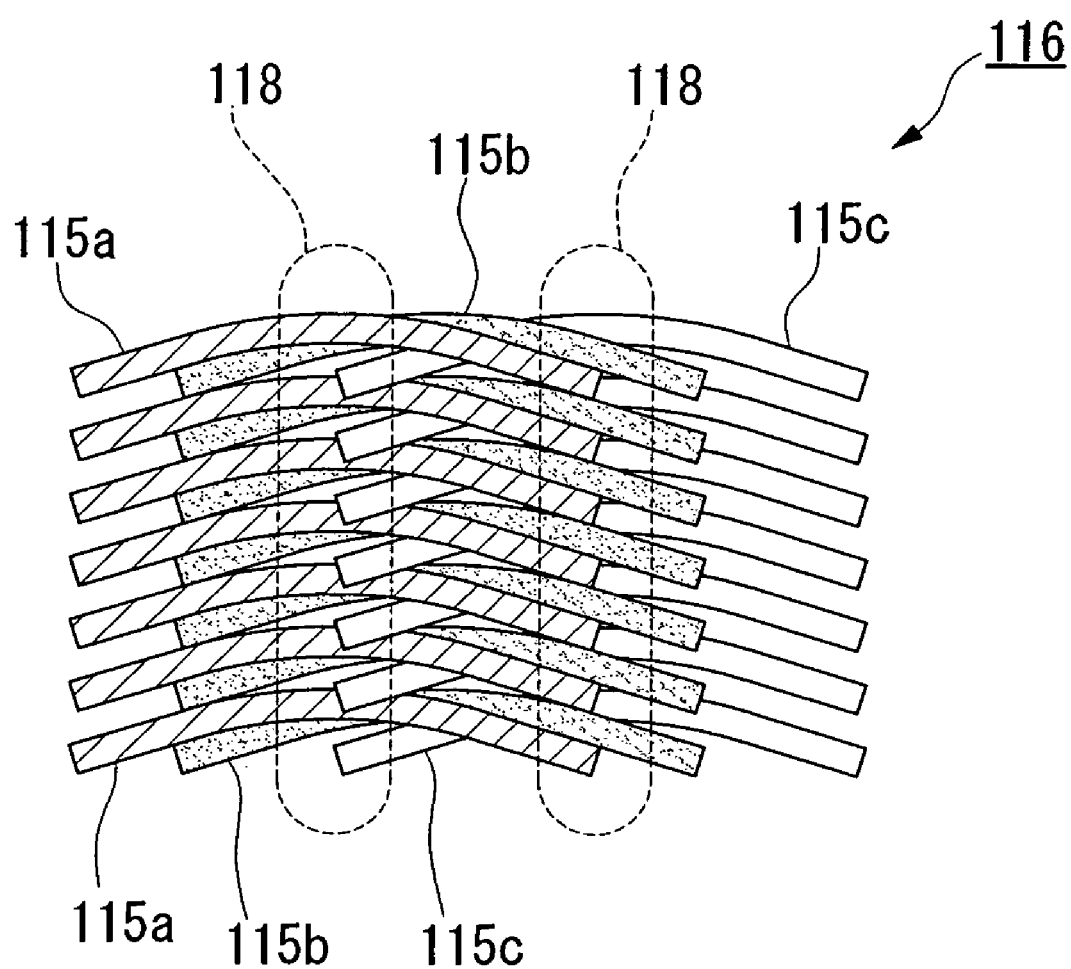
FIG. 15 is an enlarged view showing a braided portion shown in FIG. 14.

FIG. 15 is an enlarged view showing the main portion of FIG. 14. As shown in FIG. 15, in this embodiment, the position of the braided portion 118 is controlled so that the number of overlapped layers in the braided portion 118 is set to be two. Accordingly, the height of the coil end and a packing factor can be freely set.

Furthermore, when the number of turns reaches a predetermined number, the diameter of the wires supplied from the nozzle 127 is changed. For example, the bundles of wires 115 located at the radial-outer region of the spaces between tooth-shaped iron cores 111 and 111 include wires whose diameter is greater than that of the wires included in the bundles of wires 115 located at the radial-inner region.

The nozzle 127 includes the same number of nozzles 127, . . . , and 127 as the number of the phases of the stator windings 116, . . . , and 116 that are to be wound on the stator 110, and in the case of a three-phase motor, three nozzles 127, 127, and 127 are provided respectively corresponding to U1-phase, V1-phase, and W1-phase. A bundle of wires are supplied from each nozzle 127, and three nozzles 127, 127, and 127 are simultaneously made to run in a zigzag manner through the spaces between the tooth-shaped iron cores 111, . . . , and 111 while turning along the circumference. In this manner, when the nozzles 127, 127, and 127 complete plural turns, multi-phase (e.g., U1-phase, V1-phase, and W1-phase) windings are completed.

Next, as shown in, for example, FIG. 11, each of the core back iron cores 112 is press-fitted into each space between the tooth-shaped iron cores 111 and 111 adjacent to each other from a radially outer area, and the radial-inner ends of the core back iron core 112 are made to abut against two projecting portions 122 and 122 opposing each other and facing a space between the tooth-shaped iron cores 111 and 111 adjacent to each other. Then, the tooth fixing jig 126 is removed.

Next, in each of the phases, lead wires (not shown) of bundles of wires 115 formed by bundling different number of wires are connected to each other in a parallel manner, and a series of the processes is completed.

As explained above, in the present embodiment, because the bundle units 120 are formed by winding the bundle of wires 115 for three phases in a concentric manner while skipping a predetermined number of slots, and the bundles of wires 115 are made to run so that the circumferential end portions of winding of one bundle of wires and the circumferential beginning portions of winding of another bundle of wires are alternately braided, the practical state in which the bundles of wires are wound is as shown in FIG. 16, and areas of gap 122 can be reduced. Accordingly, a packing factor can be increased, the height of the coil end can be maintained to be less tall, and the magnetic flux can be made smooth.

Examples of the stator 110, which is manufactured using a method for manufacturing a stator according the above embodiment, will be explained below.

In the following examples, the stator windings 116 includes, for example, three sets of bundles of wires C1, C2, and C3. The bundle of wires C2 is disposed outside with respect to the bundle of wires C1 which runs at an innermost region, and the bundle of wires C2 is disposed outside with respect to the bundle of wires C2. The cross-sectional area of each of the wires that form the bundles of wires C1, C2, and C3 is set to be, for example, 0.04 mm$^2$ (S1) or 0.0625 mm$^2$ (S2).

The case, in which the stator windings 116 are formed such that the number of wires for forming the bundles of wires C1, C2, and C3 is set to be ten, the bundle of wires C1 includes seven wires having cross-sectional area of S1 and three wires having cross-sectional area of S2, the bundle of wires C2 includes six wires having cross-sectional area of S1 and four wires having cross-sectional area of S2, and the bundle of wires C3 includes five wires having cross-sectional area of S1 and five wires having cross-sectional area of S2, is designated as Example 1. The case, in which the bundles of wires C1, C2, and C3 are formed using ten wires having the same cross-sectional area of S1, is designated as a Comparative Example.

TABLE 1 shows, with regard to Example 1, the cross-sectional area A (total of cross-sectional areas of the wires), the circumferential length L, the ratio of the circumferential length L and the cross-sectional area A (L/A) of the bundles of wires C1, C2, and C3, difference in electrical resistance of the bundles of wires C1 and C2 due to difference in the cross-sectional area, difference in the circumferential length, and difference in electrical resistance of the bundles of wires (difference in the ratio (L/A)) when bundle of wires C3 is deemed to be the basis.

TABLE 2 shows, with regard to the bundles of wires C1, C2, and C3 in the Comparative Example, the cross-sectional area A, difference in electrical resistance due to difference in the cross-sectional area, the circumferential length L, difference in the circumferential length, the ratio of the circumferential length L and the cross-sectional area A (L/A), and difference in electrical resistance of the bundles of wires (difference in the ratio (L/A)), as in TABLE 1.

TABLE 1

Example 1

| Number of wires | Set of bundle of wires | | |
|---|---|---|---|
| | C1 | C2 | C3 |
| 1 | 0.04 | 0.04 | 0.04 |
| 2 | 0.04 | 0.04 | 0.04 |
| 3 | 0.04 | 0.04 | 0.04 |
| 4 | 0.04 | 0.04 | 0.04 |
| 5 | 0.04 | 0.04 | 0.04 |
| 6 | 0.04 | 0.04 | 0.0625 |
| 7 | 0.04 | 0.0625 | 0.0625 |
| 8 | 0.0625 | 0.0625 | 0.0625 |
| 9 | 0.0625 | 0.0625 | 0.0625 |
| 10 | 0.0625 | 0.0625 | 0.0625 |
| Cross-sectional area A (mm$^2$) | 0.4675 | 0.49 | 0.5125 |
| Difference in electrical resistance due to difference in the cross-sectional area (%) | 8.7805 | 4.3902 | 0 |
| Circumferential length L (mm) | 1268.3 | 1331.2 | 1394 |
| Difference in the circumferential length (%) | −9.01 | −4.51 | 0.00 |
| L/A | 2713 | 2717 | 2720 |
| | −0.26 | −0.12 | 0.00 |
| Difference in electrical resistance (the ratio of L/A) (%) | −0.23 | −0.12 | 0.00 |

TABLE 2

Comparative Example 1

| Number of wires | Set of bundle of wires | | |
|---|---|---|---|
| | C1 | C2 | C3 |
| 1 | 0.04 | 0.04 | 0.04 |
| 2 | 0.04 | 0.04 | 0.04 |
| 3 | 0.04 | 0.04 | 0.04 |
| 4 | 0.04 | 0.04 | 0.04 |
| 5 | 0.04 | 0.04 | 0.04 |
| 6 | 0.04 | 0.04 | 0.04 |
| 7 | 0.04 | 0.04 | 0.04 |
| 8 | 0.04 | 0.04 | 0.04 |
| 9 | 0.04 | 0.04 | 0.04 |
| 10 | 0.04 | 0.04 | 0.04 |
| Cross-sectional area A (mm$^2$) | 0.4 | 0.4 | 0.4 |
| Difference in electrical resistance due to difference in the cross-sectional area (%) | 0 | 0 | 0 |
| Circumferential length L (mm) | 1268.3 | 1331.2 | 1394 |
| Difference in the circumferential length (%) | −9.01 | −4.51 | 0.00 |
| L/A | 3171 | 3328 | 3485 |
| | −9.01 | −4.51 | 0.00 |
| Difference in electrical resistance (the ratio of L/A) (%) | −9.01 | −4.51 | 0.00 |

When, for example, the relationship between change in the temperature due to heat generation and change in the electrical resistance during supply of electrical energy to the stator windings 116 is assumed to be 0.4%/° C., and allowable range of local temperature difference in the stator windings 116 is assumed to be 10° C., the difference in the electrical resistance in the stator windings 116 must be set to be 4%.

In the Comparative Example shown in TABLE 2, because the bundles of wires C1, C2, and C3 include the same number of wires whose cross-sectional areas are the same each other, the cross-sectional areas A are the same each other, and there are differences in the electrical resistances depending on the difference in the circumferential length of the bundles of wires C1, C2, and C3. More specifically, when the outermost bundle of wires C3 is assumed to be the basis, the electrical resistance of the bundle of wires C2 is less than that of the bundle of wires C3 by 4.51%, and the electrical resistance of the innermost bundles of wires C1 is less than that of the bundle of wires C3 by 9.01%, i.e., the differences in the electrical resistances exceed 4%, which is the allowable difference.

On the other hand, in Example 1 shown in TABLE 1, because the cross-sectional area of the inner bundle of wires is set to be less than that of the outer bundle of wires, there are differences in the electrical resistances depending on the cross-sectional areas A of wires C1, C2, and C3. More specifically, when the outermost bundle of wires C3 is assumed to be the basis, the electrical resistance of the bundle of wires C2 depending on the cross-sectional area A is greater than that of the bundle of wires C3 by 4.39%, and the electrical resistance of the innermost bundles of wires C1 depending on the cross-sectional area A is greater than that of the bundle of wires C3 by 8.78%.

Moreover, as in the case of the Comparative Examples, there are differences in the electrical resistances depending on the difference in the circumferential length of the bundles of wires C1, C2, and C3, i.e., the electrical resistance of the inner bundles of wires depending on the difference in the circumferential length is less than that of the outermost bundle of wires C3.

Accordingly, the electrical resistance depending on the cross-sectional areas A is compensated for by the electrical resistance depending on the difference in the circumferential length L, and when the outermost bundle of wires C3 is assumed to be the basis, the electrical resistance of the bundle of wires C2 is greater than that of the bundle of wires C3 by 0.12%, and the electrical resistance of the innermost bundles of wires C1 is greater than that of the bundle of wires C3 by 0.23%, i.e., the differences in the electrical resistances are within 4%, which is the allowable difference.

More specifically, by adjusting the cross-sectional area of the wires of the bundles of wires C1, C2, and C3 depending on the radial position thereof between the tooth-shaped iron cores 111, . . . , and 111, the differences in the electrical resistances of the bundles of wires C1, C2, and C3 can be set approximately within 1%, and thus the local temperature difference in the stator windings 116 can be maintained within the allowable range.

As explained above, according to the stator windings 110 of the present embodiment, with regard to the bundles of wires of the stator winding 116, the electrical resistances of the bundles of wires can be set to be substantially the same value, regardless of the radial position of the bundles of wires between the tooth-shaped iron cores 111, . . . , and 111, by compensating the electrical resistance depending on the cross-sectional area of the bundle of wires by the electrical resistance depending on the circumferential length of the bundle of wires. Accordingly, a decrease in a packing factor and an increase in the height of the coil ends can be avoided when the electrical resistances of the bundles of wires are set to be substantially the same value.

In the above embodiment, the cross-sectional area of the wires of the inner bundle of wires is set to be less (i.e., the cross-sectional area of the wires of the outer bundle of wires is set to be greater); however, the number of the wires of the inner bundle of wires may be set to be less (i.e., the number of the wires of the wires of the outer bundle of wires may be set to be greater). This configuration is shown as Example 2. Example 2 includes, as Example 1, three sets of bundles of wires C1, C2, and C3. The cross-sectional area of each of the wires that form the bundles of wires C1, C2, and C3 is set to be, for example, 0.0625 mm² (S2). The stator windings 116 are formed such that the bundle of wires C1 includes 18 wires, the bundle of wires C2 includes 19 wires, and the bundle of wires C3 includes 20 wires.

TABLE 3 shows, with regard to the bundles of wires C1, C2, and C3 in Example 2, the cross-sectional area A, difference in electrical resistance due to difference in the cross-sectional area, the circumferential length L, difference in the circumferential length, the ratio of the circumferential length L and the cross-sectional area A (L/A), and difference in electrical resistance of the bundles of wires (difference in the ratio (L/A)), as in TABLE 1.

TABLE 3

Example 2

| Number of wires | Set of bundle of wires | | |
|---|---|---|---|
| | C1 | C2 | C3 |
| 1 | 0.0625 | 0.0625 | 0.0625 |
| 2 | 0.0625 | 0.0625 | 0.0625 |
| 3 | 0.0625 | 0.0625 | 0.0625 |
| 4 | 0.0625 | 0.0625 | 0.0625 |
| 5 | 0.0625 | 0.0625 | 0.0625 |
| 6 | 0.0625 | 0.0625 | 0.0625 |
| 7 | 0.0625 | 0.0625 | 0.0625 |
| 8 | 0.0625 | 0.0625 | 0.0625 |
| 9 | 0.0625 | 0.0625 | 0.0625 |
| 10 | 0.0625 | 0.0625 | 0.0625 |
| 11 | 0.0625 | 0.0625 | 0.0625 |
| 12 | 0.0625 | 0.0625 | 0.0625 |
| 13 | 0.0625 | 0.0625 | 0.0625 |
| 14 | 0.0625 | 0.0625 | 0.0625 |
| 15 | 0.0625 | 0.0625 | 0.0625 |
| 16 | 0.0625 | 0.0625 | 0.0625 |
| 17 | 0.0625 | 0.0625 | 0.0625 |
| 18 | 0.0625 | 0.0625 | 0.0625 |
| 19 | — | 0.0625 | 0.0625 |
| 20 | — | — | 0.0625 |
| Cross-sectional area A (mm²) | 1.125 | 1.188 | 1.250 |
| Difference in electrical resistance due to difference in the cross-sectional area (%) | 10 | 5 | 0 |
| Circumferential length L (mm) | 1268.3 | 1331.2 | 1394.0 |
| Difference in the circumferential length (%) | −9.01 | −4.51 | 0.00 |
| L/A | 1127.4 | 1121.0 | 1115.2 |
| Difference in electrical resistance (the ratio of L/A) (%) | 1.09 | 0.52 | 0.00 |

In Example 2 shown in TABLE 3, the number of the wires of the inner bundle of wires is set to be less than that of the outer bundle of wires, there are differences in the electrical resistances depending on the cross-sectional areas A of wires C1, C2, and C3. More specifically, when the outermost bundle of wires C3 is assumed to be the basis, the electrical resistances of the bundle of wires C2 and C1 depending on the cross-sectional area A are greater than that of the bundle of wires C3 by 5% and 10%, respectively.

Accordingly, as in Example 1, the electrical resistance depending on the cross-sectional areas A is compensated for by the electrical resistance depending on the difference in the circumferential length L, and when the outermost bundle of wires C3 is assumed to be the basis, the electrical resistance of the bundle of wires C2 is greater than that of the bundle of wires C3 by 0.52%, and the electrical resistance of the innermost bundles of wires C1 is greater than that of the bundle of wires C3 by 1.09%, i.e., the differences in the electrical resistances are within 4%, which is the allowable difference.

More specifically, by adjusting the number of the wires of the bundles of wires C1, C2, and C3 depending on the radial position thereof between the tooth-shaped iron cores 111, . . . , and 111, the differences in the electrical resistances of the bundles of wires C1, C2, and C3 can be set approximately within 1%, and thus the local temperature difference in the stator windings 116 can be maintained within the allowable range.

INDUSTRIAL APPLICABILITY

As explained above, in the stator according to the first aspect of the present invention, the circumferential width of each of the tooth-shaped iron cores at a radial-outer region can be, for example, set to be greater than that at a radial-inner region, and when the core back iron cores are press-fitted, the core back iron cores are fixed by being sandwiched by the radial-outer regions of the tooth-shaped iron cores adjacent to each other, and thus the core back iron cores and the tooth-shaped iron cores can be prevented from coming off in the radial direction.

In the stator according to the second aspect of the present invention, a packing factor can be increased while maintaining the height of the coil end to be less tall. In addition, because the bundles of wires can be substantially uniformly wound through the slots, the magnetic flux can be made smooth.

In the stator according to the third aspect of the present invention, the probability of twisting of the bundle of wires that connects the adjacent bundle units to each other can be reduced, and degree of freedom in forming the bundle unit can be increased, and thus a packing factor can be further increased.

In the stator according to the fourth and fifth aspects of the present invention, resistance loss in the stator can be restrained to be low, and operational efficiency of a motor incorporating the stator can be increased.

In the stator according to the sixth aspect of the present invention, the stator is made stable in the radial direction, and reliability of the stator can be increased.

In the stator according to the seventh aspect of the present invention, when each of the core back iron cores is inserted between the tooth-shaped iron cores adjacent to each other, the displacement of the core back iron core in the radially inward direction is restrained upon abutting of the extending portion of the core back iron core against the radial outer surface of the tooth-shaped iron cores.

In the stator according to the eighth aspect of the present invention, by the engagement of the extending portion of the core back iron core with the recess formed in the tooth-shaped iron core, the displacement of the core back iron core in the radially inward direction can be restrained.

In the stator according to the ninth aspect of the present invention, when each of the core back iron cores is inserted between the tooth-shaped iron cores adjacent to each other, the displacement of the core back iron core in the radially inward direction is restrained upon abutting of the radial-inner end of the core back iron core against the projecting portion of the tooth-shaped iron core, and thus the core back iron core can be located at a predetermined position.

In the stator according to the tenth aspect of the present invention, because the core back iron cores are inserted from a radial-outer area into spaces between the tooth-shaped iron cores adjacent to each other after forming the stator windings on the tooth-shaped iron cores, a decrease in a packing factor can be avoided.

In addition, by disposing tooth-shaped iron cores, each of which is formed so that the circumferential width thereof is greater at a radial-outer region than at a radial-inner region, so that the distance between the tooth-shaped iron cores adjacent to each other is set so as to decrease from a radial-inner region to a radial-outer region, or alternatively, is set to be a predetermined value over a range from a radial-inner region to a radial-outer region, connecting force between the cores back iron cores and the tooth-shaped iron cores can be increased, and thus the core back iron cores and the tooth-shaped iron cores can be prevented from coming off in the radial direction.

In the stator according to the eleventh aspect of the present invention, a packing factor can be increased, the height of the coil end can be maintained to be less tall, and the magnetic flux can be made smooth.

The invention claimed is:

1. A stator, comprising:
   tooth-shaped iron cores disposed along a predetermined circumference at predetermined intervals, each of which is formed so that the circumferential width thereof is greater at a radial-outer region than at a radial-inner region;
   stator windings formed on the tooth-shaped iron cores by being supplied from an radial-outer area using plural nozzles that simultaneously supply plural stator windings; and
   core back iron cores, each of which is inserted between the tooth-shaped iron cores adjacent to each other from an radial-outer area,
   wherein each of the tooth-shaped iron cores has a projecting portion projecting from a radial-middle region thereof, wherein said projecting portion extends outwardly from a portion for winding and a yoke portion of said tooth-shaped iron core, said projecting portion being abuttable against a radial-inner end of one of the core back iron cores.

2. A stator according to claim 1, wherein each of the core back iron core comprises an extending portion extending from the radially outermost end thereof.

3. A stator according to claim 2, wherein each of the tooth-shaped iron cores comprises a recess at the radially outermost end thereof, with each of which one the extending portion of the core back iron core is engageable.

4. A method for manufacturing a stator, comprising:
   a first step of positioning tooth-shaped iron cores, each of which is formed having a circumferential width thereof greater at a radial-outer region than at a radial-inner region, along a predetermined circumference at predetermined intervals;
   a second step of forming stator windings on the tooth-shaped iron cores by supplying the stator windings from an radial-outer area to a radial-inner region of a projecting portion, projecting from a radial-middle region thereof using plural nozzles that simultaneously supply plural stator windings; and
   a third step of inserting core back iron cores from an radial-outer area into spaces between the tooth-shaped iron cores adjacent to each other, such that said projecting portion extends outwardly from a portion for winding and a yoke portion of said tooth-shaped iron core and abuts against a radial-inner end of one of said core back iron cores.

* * * * *